(12) United States Patent
Ryman et al.

(10) Patent No.: US 11,907,183 B2
(45) Date of Patent: Feb. 20, 2024

(54) TECHNIQUES FOR STORING TESTABLE, SCHEMA-STRUCTURED ASSOCIATIONS AND SYSTEMS AND METHODS IMPLEMENTING SAME

(71) Applicant: Scholati LLC, Round Rock, TX (US)

(72) Inventors: Kyle N. Ryman, Round Rock, TX (US); Jackson R. McGehee, III, Peachtree Corners, GA (US)

(73) Assignee: Kyle N. Ryman, Georgetown, TX (US)

( * ) Notice: Subject to any disclaimer, the term of this patent is extended or adjusted under 35 U.S.C. 154(b) by 85 days.

(21) Appl. No.: 17/653,028

(22) Filed: Mar. 1, 2022

(65) Prior Publication Data

US 2022/0283994 A1 Sep. 8, 2022

Related U.S. Application Data

(60) Provisional application No. 63/156,255, filed on Mar. 3, 2021.

(51) Int. Cl.
*G06F 3/048* (2013.01)
*G06F 16/21* (2019.01)

(52) U.S. Cl.
CPC ................... *G06F 16/211* (2019.01)

(58) Field of Classification Search
CPC .............. G06F 16/211; G06F 3/048
See application file for complete search history.

(56) References Cited

U.S. PATENT DOCUMENTS

| | | | |
|---|---|---|---|
| 10,416,863 B2 * | 9/2019 | Kaieda | G06F 3/0482 |
| 11,153,740 B2 * | 10/2021 | Conley-Lepene | G06F 16/9535 |
| 2009/0193024 A1 * | 7/2009 | Dhananjaya | G06Q 10/10 715/764 |
| 2009/0217246 A1 * | 8/2009 | Kondur | G06Q 30/02 717/126 |
| 2013/0007637 A1 * | 1/2013 | Marchese | G06F 3/0481 715/757 |
| 2020/0176127 A1 * | 6/2020 | Tseng | G16H 70/40 |
| 2021/0049476 A1 * | 2/2021 | Davis | G06N 5/02 |

* cited by examiner

*Primary Examiner* — Rashawn N Tillery
(74) *Attorney, Agent, or Firm* — Grossman, Tucker, Perreault & Pfleger, PLLC

(57) ABSTRACT

In an approach to managing at least one compendium comprising association objects that collectively provide an information-domain schema for associating cue values with corresponding user-provided responses, at least one first association object is identified with an undefined response based on a responses collection of the first association object. A first user-editable placeholder is caused to be visualized on a display to a user based on identifying the at least one first association object with the undefined response. User input is received based on the first user-editable placeholder. At least a second association object is instantiated based on the user input. A representation of the second association object is caused to be visualized on the display to the user and a second user-editable placeholder to be visualized on the display adjacent the representation of the second association object based on a schema type value of the first association object.

20 Claims, 40 Drawing Sheets

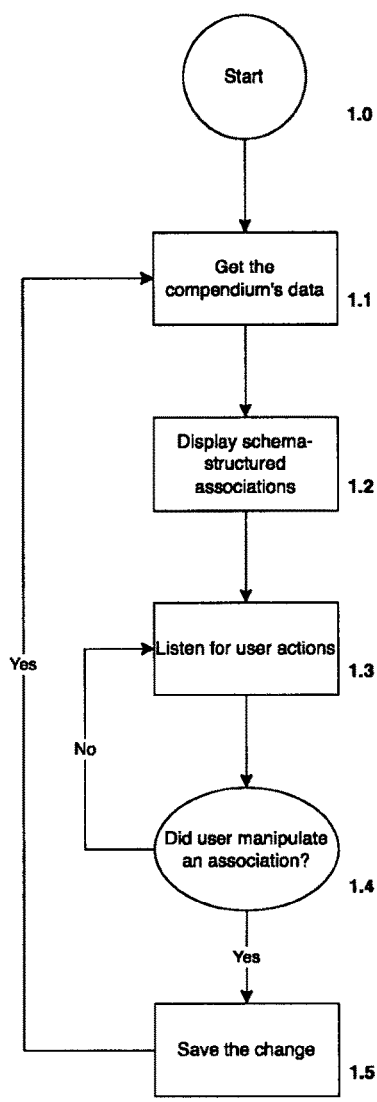

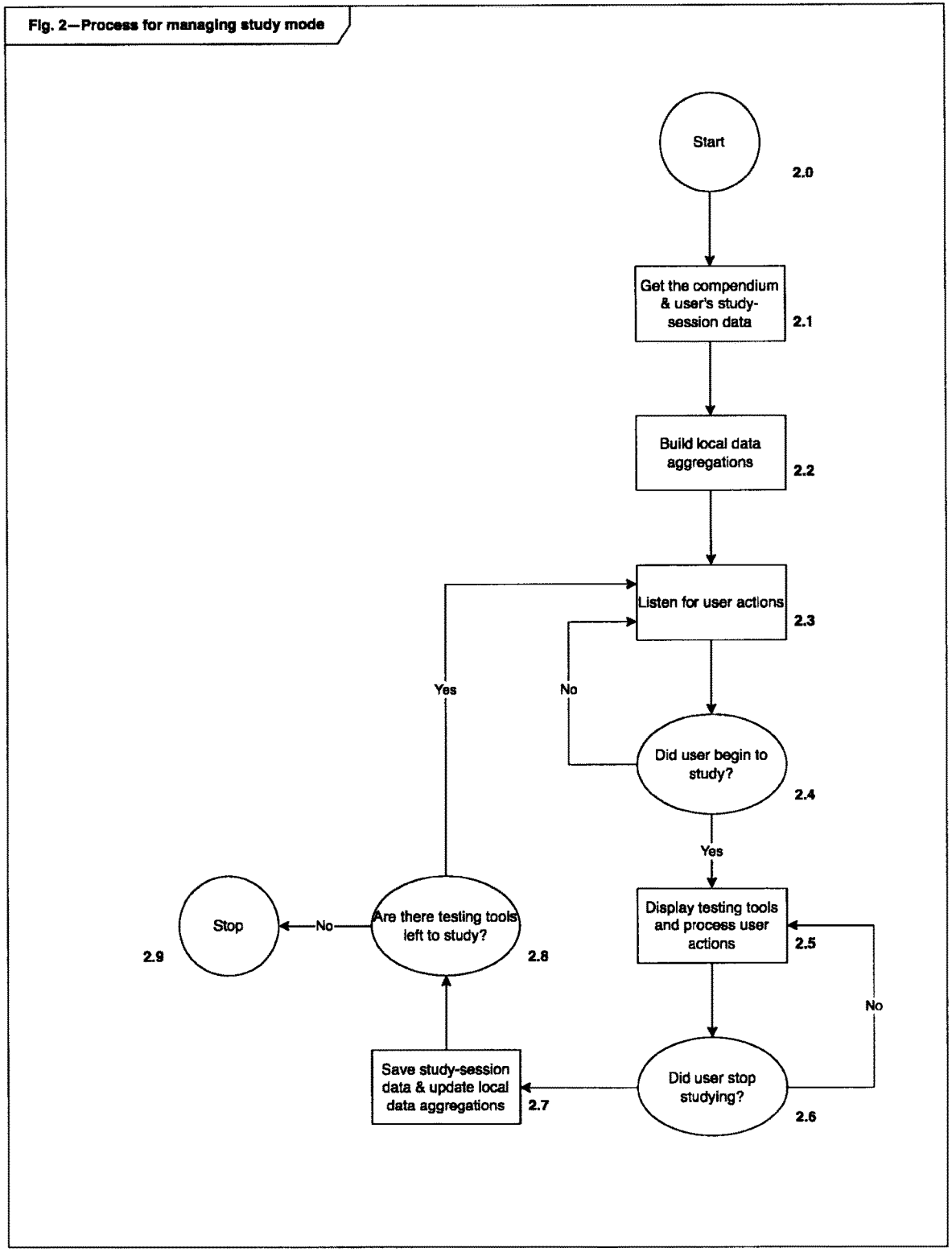

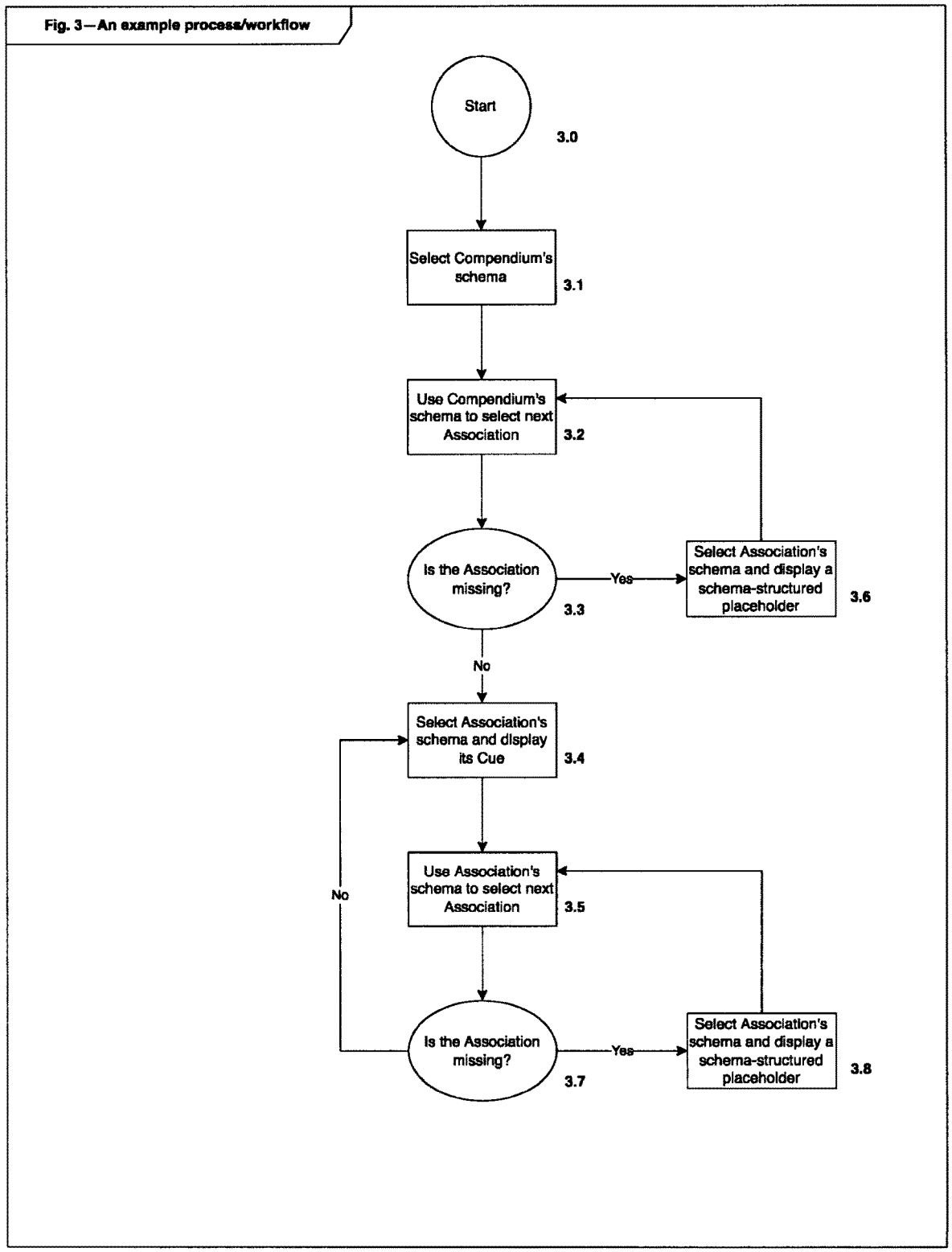

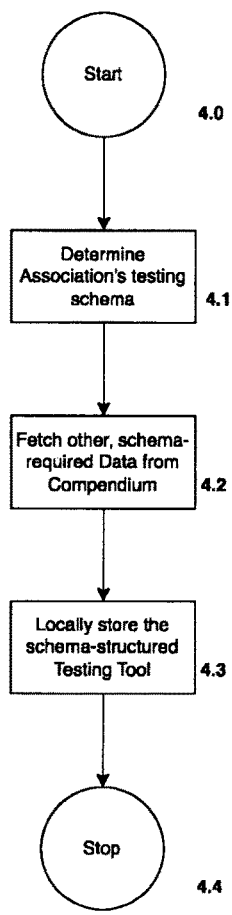
Fig. 4—An example process/workflow

TORTS

Reading mode: Off ⚪ On 🌙  ≡

§ 1.  Intentional torts

§ 1.1.  Battery

5.01 → (1)  An element or factor for this issue's governing test

—Test operation—

Add a description of how this test operates

—Illustrations—

(a)  Add a prompt to work on some illustrations

—Case law—

(a)  Add a citation to a case

—Policies—

(a)  Add a policy

—Dicta—

(a)  Add an idea you want to remember

§ 1.2.  Add an issue

\* \* \*

HINTS ⓘ

UNDO ↺

REDO ↻

Fig. 5

TORTS  Reading mode: Off ⬤ On

§ 1.1.   Battery (1) What element or factor applies to this test?

The intentional touching of a person; and

☐ Do you want to lock this chunk from further edits?

✓ Do you want to study this chunk?

What is your source for this chunk?

Adams v. Baker (1882)

What is a shorthand name you can use to remember this chunk?

intent element

What is a mnemonic you can use to remember this chunk?

TORTS

Reading mode: Off  On ☾  ≡

§ 1.1.   Battery (1)    [i] <u>The intentional touching of a person</u>, Adams v. Baker (1882) ("intent element"); and    HINTS ⓘ

(2)    An element or factor for this issue's governing test

~Test operation~

Add a description of how this test operates

~Illustrations~

(a)    Add a prompt to work on some illustrations

~Case law~

(a)    Add a citation to a case

~Policies~

(a)    Add a policy

~Dicta~

(a)    Add an idea you want to remember

§ 1.2.   Add an issue

* * *

§ 2.   New topic

Fig. 7

TORTS  Reading mode: Off ⬤ On 🌙  ≡

§ 1.     Intentional torts

§ 1.1.     Battery (1)    [I] The intentional touching of a person, Adams v. Baker (1882) ("intent element"); and (2)    [HO] Such touching was either harmful or offensive.

(3)    An element or factor for this issue's governing test

~Test operation~

Add a description of how this test operates

~Illustrations~

(a)    Add a prompt to work on some illustrations

~Case law~

(a)    Add a citation to a case

~Policies~

(a)    Add a policy

~Dicta~

(a)    Add an idea you want to remember

§ 1.2.     Add an issue

✱ ✱ ✱

§ 2.     New topic

[HINTS] [UNDO] [REDO]

Fig. 8

TORTS

§ 1. Intentional torts

§ 1.1. Battery (1) [I] The intentional touching of a person, Adams v. Baker (1882) ("intent element"); and (2) [HO] Such touching was either harmful or offensive.

(3) An element or factor for this issue's governing test

—Test operation—

The plaintiff has the burden of proof to establish each element of Battery.

—Illustrations—

(a) Add a prompt to work on some illustrations

—Case law—

(a) Add a citation to a case

—Policies—

(a) Add a policy

—Dicta—

(a) Add an idea you want to remember

§ 1.2. Add an issue

TORTS
Reading mode: Off  On )     ≡
§ 1.  Intentional torts
§ 1.1.  Battery
(1)  [I] The intentional touching of a person, Adams v. Baker (1882) ("intent element"); and
(2)  [HO] Such touching was either harmful or offensive.
—Test operation—
The plaintiff has the burden of proof to establish each element of Battery.
Fig. 10

MILITARY HISTORY  Reading mode: Off ⬤ On ☾  ≡

[HINTS ⓘ]

I. World War II

A. Battle of Britain (1) [Who] Germany attacked Britain;

(2) [What] The Battle was fought entirely in the Air between each country's airforce;

(3) [When] Fought from July to October 1940;

(4) [Where] Fought over the English Channel and the British Isles;

(5) [Why] Germany's objective was to knock Britain out of the war.

(6) An idea that should immediately come to mind

~Pattern recognition~

(a) Add a prompt to work on your pattern recognition

~Questions & answers~

(a) Add an idea you want to remember

B. Add a subtopic

* * *

[UNDO ↶]

II. New topic

[REDO ↷]

Fig. 11

MILITARY HISTORY  Reading mode: Off ● On
I. World War II
A. Battle of Britain
(1) [Who] Germany attacked Britain;
(2) [What] The Battle was fought entirely in the Air between each country's airforce;
(3) [When] Fought from July to October 1940;
(4) [Where] Fought over the English Channel and the British Isles;
(5) [Why] Germany's objective was to knock Britain out of the war.
Fig. 12

Cram: Off  On ☾ ≡

Countdown: 2' 32"

< >  Ⓝ

Remaining: 12 (0 completed)

Context: Intentional torts

Think about: Battery

When thinking about this issue, what mnemonic immediately comes to mind?

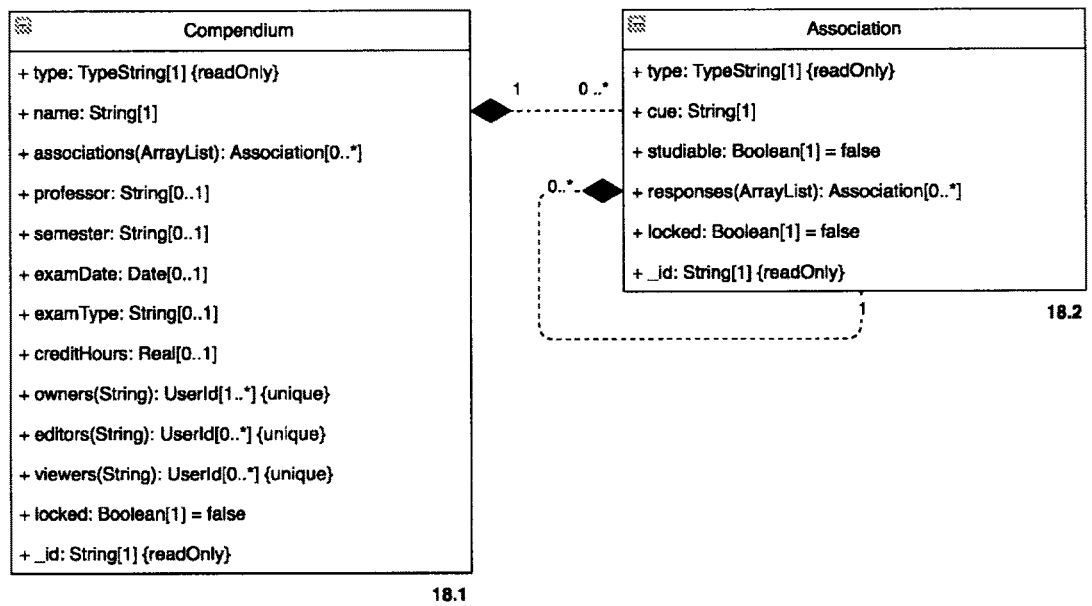

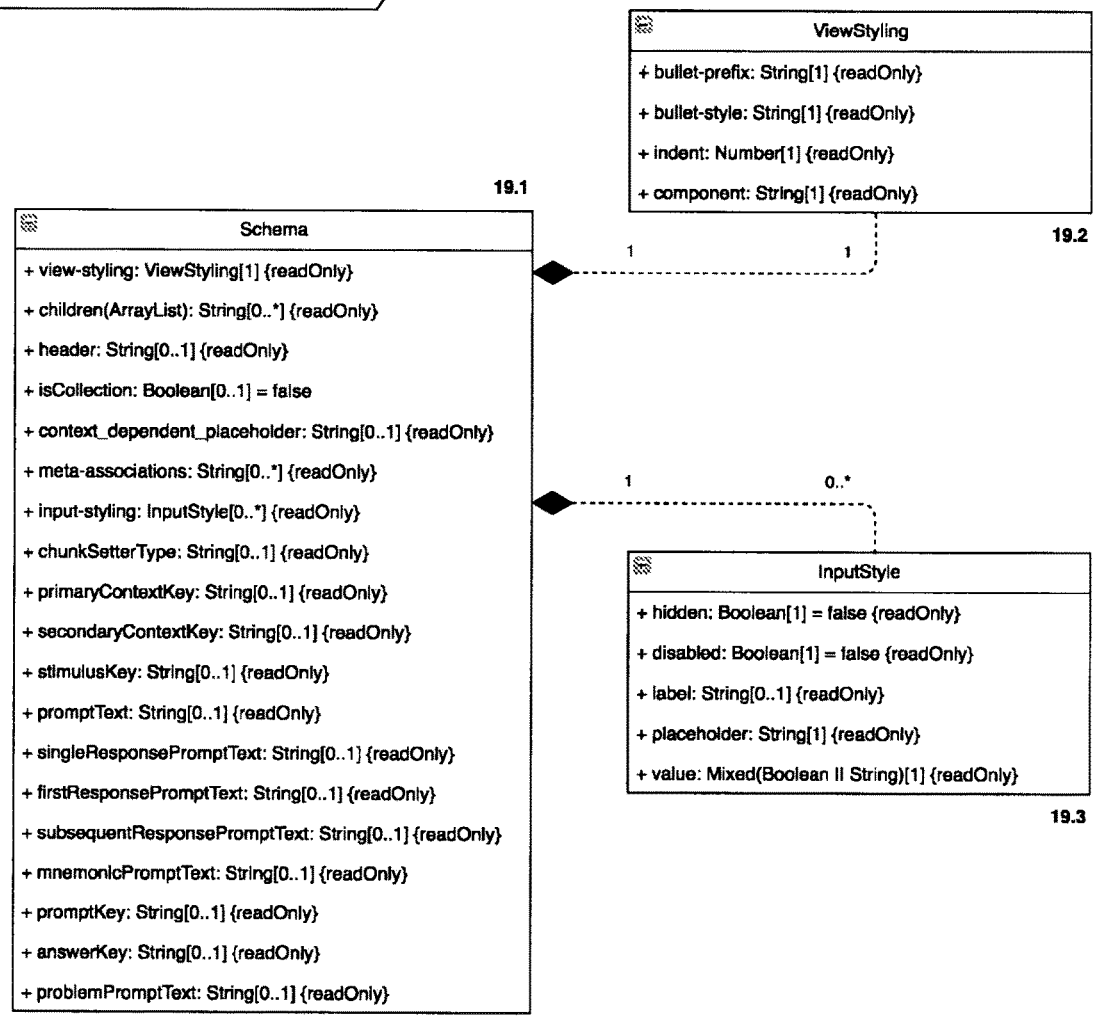

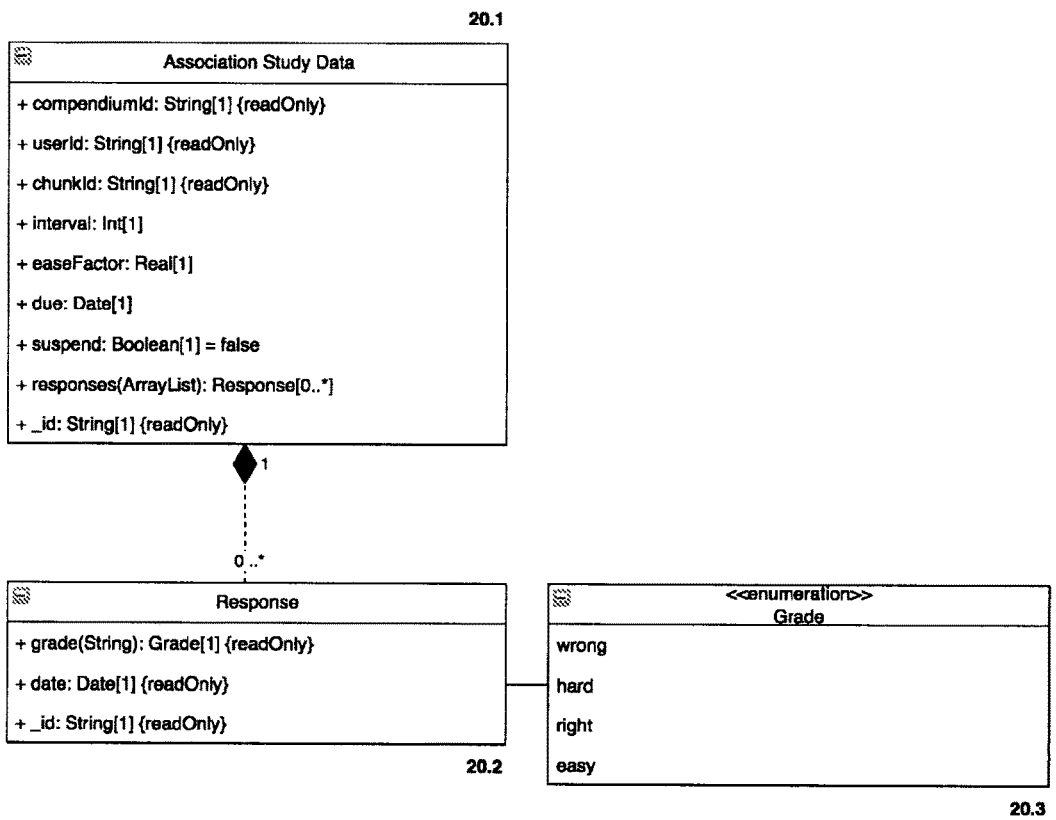

```json
{
  "_id": "620164ea2801c700161846a7",
  "owners": ["608e86c8b8ef7c0015b4e6a2"],
  "editors": [],
  "viewers": [],
  "type": "marshall",
  "name": "Torts",
  "professor": "Prof. Ryman",
  "semester": "Spring 2022",
  "examDate": "2021-12-15",
  "examType": "Closed-book, issue spotter",
  "creditHours": 4,
  "locked": false,
  "associations": [
    {
      "_id": "620f721c4b05f800164b04e4",
      "type": "topic",
      "cue": "Intentional torts",
      "studiable": false,
      "locked": false,
      "responses": [
        {
          "_id": "620f72294b05f800164b04e6",
          "type": "issue",
          "cue": "Battery",
          "studiable": true,
          "locked": false,
          "responses": [
            {
              "_id": "620f72784b05f800164b04e9",
              "type": "ruleRecall",
              "cue": "The intentional touching of a person; and",
              "studiable": true,
              "locked": false,
              "responses": [
                {
                  "_id": "620f72784b05f800164b04ea",
                  "type": "meta_source",
                  "cue": "Adams v. Baker (1882)",
                  "locked": false,
                  "studiable": true,
                  "responses": []
                },
                {
                  "_id": "620f72784b05f800164b04eb",
                  "type": "meta_shorthand",
                  "cue": "intent element",
                  "locked": false,
                  "studiable": true,
                  "responses": []
                },
                {
                  "_id": "620f72784b05f800164b04ec",
                  "type": "meta_mnemonic",
                  "cue": "I",
                  "locked": false,
                  "studiable": true,
                  "responses": []
                }
```

Fig. 21A

```
 60        }
 61      },
 62      {
 63        "_id": "620f72a74b05f800164b04f9",
 64        "type": "ruleRecall",
 65        "cue": "Such touching was either harmful or offensive,",
 66        "studiable": true,
 67        "locked": false,
 68        "responses": [
 69          {
 70            "_id": "620f72a74b05f800164b04fa",
 71            "type": "meta_source",
 72            "cue": "[[ EMPTY CUE ]]",
 73            "locked": false,
 74            "studiable": true,
 75            "responses": []
 76          },
 77          {
 78            "_id": "620f72a74b05f800164b04fb",
 79            "type": "meta_shorthand",
 80            "cue": "[[ EMPTY CUE ]]",
 81            "locked": false,
 82            "studiable": true,
 83            "responses": []
 84          },
 85          {
 86            "_id": "620f72a74b05f800164b04fc",
 87            "type": "meta_mnemonic",
 88            "cue": "HO",
 89            "locked": false,
 90            "studiable": true,
 91            "responses": []
 92          }
 93        ]
 94      },
 95      {
 96        "_id": "620f72cb4b05f800164b0507",
 97        "type": "ruleOperation",
 98        "cue": "The plaintiff has the burden of proof to establish each element of Battery.",
 99        "studiable": true,
100        "locked": false,
101        "responses": [
102          {
103            "_id": "620f72cb4b05f800164b0508",
104            "type": "meta_source",
105            "cue": "[[ EMPTY CUE ]]",
106            "locked": false,
107            "studiable": true,
108            "responses": []
109          },
110          {
111            "_id": "620f72cb4b05f800164b0509",
112            "type": "meta_shorthand",
113            "cue": "[[ EMPTY CUE ]]",
114            "locked": false,
115            "studiable": true,
116            "responses": []
117          },
118          {
```

Fig. 21B

```
119            "_id": "620f72cb4b05f800164b050a",
120            "type": "meta_mnemonic",
121            "cue": "[[ EMPTY CUE ]]",
122            "locked": false,
123            "studiable": true,
124            "responses": []
125          }
126         ]
127        }
128       ]
129      }
130     ]
131    }
132   ],
133   "__v": 0
134 }
135
```

Fig. 21C

```
1  {
2    "_id": "620f732f4b05f800164b050b",
3    "owners": ["608e86c8b8ef7c0015b4e6a2"],
4    "editors": [],
5    "viewers": [],
6    "type": "ebbinghaus",
7    "name": "Military History",
8    "professor": "Dr. Brian Linn",
9    "semester": "Fall 2006",
10   "examDate": "2021-12-15",
11   "examType": "Closed-book, issue spotter",
12   "creditHours": 4,
13   "locked": false,
14   "associations": [
15     {
16       "_id": "620f73424b05f800164b050c",
17       "type": "topic",
18       "cue": "World War II",
19       "studiable": false,
20       "locked": false,
21       "responses": [
22         {
23           "_id": "620f73474b05f800164b050e",
24           "type": "subtopic",
25           "cue": "Battle of Britain",
26           "studiable": true,
27           "locked": false,
28           "responses": [
29             {
30               "_id": "620f734f4b05f800164b0511",
31               "type": "immediateRecall",
32               "cue": "Germany attacked Britain;",
33               "studiable": true,
34               "locked": false,
35               "responses": [
36                 {
37                   "_id": "620f734f4b05f800164b0512",
38                   "type": "meta_source",
39                   "cue": "[[ EMPTY CUE ]]",
40                   "locked": false,
41                   "studiable": true,
42                   "responses": []
43                 },
44                 {
45                   "_id": "620f734f4b05f800164b0513",
46                   "type": "meta_shorthand",
47                   "cue": "[[ EMPTY CUE ]]",
48                   "locked": false,
49                   "studiable": true,
50                   "responses": []
51                 },
52                 {
53                   "_id": "620f734f4b05f800164b0514",
54                   "type": "meta_mnemonic",
55                   "cue": "Who",
56                   "locked": false,
57                   "studiable": true,
58                   "responses": []
59                 }
```

Fig. 22A

```
60        ]
61      },
62      {
63        "_id": "620f73684b05f800164b051b",
64        "type": "immediateRecall",
65        "cue": "The Battle was fought entirely in the Air between each country's airforce;",
66        "studiable": true,
67        "locked": false,
68        "responses": [
69          {
70            "_id": "620f73684b05f800164b051c",
71            "type": "meta_source",
72            "cue": "[[ EMPTY CUE ]]",
73            "locked": false,
74            "studiable": true,
75            "responses": []
76          },
77          {
78            "_id": "620f73684b05f800164b051d",
79            "type": "meta_shorthand",
80            "cue": "[[ EMPTY CUE ]]",
81            "locked": false,
82            "studiable": true,
83            "responses": []
84          },
85          {
86            "_id": "620f73684b05f800164b051e",
87            "type": "meta_mnemonic",
88            "cue": "What",
89            "locked": false,
90            "studiable": true,
91            "responses": []
92          }
93        ]
94      },
95      {
96        "_id": "620f73804b05f800164b0533",
97        "type": "immediateRecall",
98        "cue": "Fought from July to October 1940;",
99        "studiable": true,
100       "locked": false,
101       "responses": [
102         {
103           "_id": "620f73804b05f800164b0534",
104           "type": "meta_source",
105           "cue": "[[ EMPTY CUE ]]",
106           "locked": false,
107           "studiable": true,
108           "responses": []
109         },
110         {
111           "_id": "620f73804b05f800164b0535",
112           "type": "meta_shorthand",
113           "cue": "[[ EMPTY CUE ]]",
114           "locked": false,
115           "studiable": true,
116           "responses": []
117         },
118         {
```

Fig. 22B

```
119         "_id": "620f73804b05f800164b0536",
120         "type": "meta_mnemonic",
121         "cue": "When",
122         "locked": false,
123         "studiable": true,
124         "responses": []
125       }
126     ]
127   },
128   {
129     "_id": "620f73944b05f800164b0545",
130     "type": "immediateRecall",
131     "cue": "Fought over the English Channel and the British Isles;",
132     "studiable": true,
133     "locked": false,
134     "responses": [
135       {
136         "_id": "620f73944b05f800164b0546",
137         "type": "meta_source",
138         "cue": "[[ EMPTY CUE ]]",
139         "locked": false,
140         "studiable": true,
141         "responses": []
142       },
143       {
144         "_id": "620f73944b05f800164b0547",
145         "type": "meta_shorthand",
146         "cue": "[[ EMPTY CUE ]]",
147         "locked": false,
148         "studiable": true,
149         "responses": []
150       },
151       {
152         "_id": "620f73944b05f800164b0548",
153         "type": "meta_mnemonic",
154         "cue": "Where",
155         "locked": false,
156         "studiable": true,
157         "responses": []
158       }
159     ]
160   },
161   {
162     "_id": "620f73a54b05f800164b055b",
163     "type": "immediateRecall",
164     "cue": "Germany's objective was to knock Britain out of the war.",
165     "studiable": true,
166     "locked": false,
167     "responses": [
168       {
169         "_id": "620f73a54b05f800164b055c",
170         "type": "meta_source",
171         "cue": "[[ EMPTY CUE ]]",
172         "locked": false,
173         "studiable": true,
174         "responses": []
175       },
176       {
```

Fig. 22C

```
177              "_id": "620f73a54b05f800164b055d",
178              "type": "meta_shorthand",
179              "cue": "[[ EMPTY CUE ]]",
180              "locked": false,
181              "studiable": true,
182              "responses": []
183          },
184          {
185              "_id": "620f73a54b05f800164b055e",
186              "type": "meta_mnemonic",
187              "cue": "Why",
188              "locked": false,
189              "studiable": true,
190              "responses": []
191          }
192        ]
193      }
194    ]
195   }
196  ]
197 }
198   ],
199   "__v": 0
200 }
201
```

Fig. 22D

```json
{
  "view-styling": {
    "bullet-prefix": "none",
    "bullet-style": "none",
    "indent": 0,
    "component": "Compendium"
  },
  "children": ["topic"]
}
```

Fig. 23

```
1  {
2    "context_dependent_placeholder": "New topic",
3    "view-styling": {
4      "bulletPrefix": "§",
5      "bulletStyle": "numeric-dot",
6      "indent": 0,
7      "component": "Topic"
8    },
9    "children": ["issue"],
10   "input-styling": {
11     "associationCue": {
12       "hidden": false,
13       "disabled": false,
14       "label": "What topic are you studying?",
15       "placeholder": "Intentional torts",
16       "value": ""
17     },
18     "associationStudiable": {
19       "hidden": true,
20       "disabled": true,
21       "value": false
22     },
23     "associationLocked": {
24       "hidden": false,
25       "disabled": false,
26       "label": "Lock from further editing",
27       "value": false
28     }
29   }
30 }
31
```

Fig. 24

```json
{
  "context_dependent_placeholder": "Add an issue",
  "view-styling": {
    "bulletPrefix": "§",
    "bulletStyle": "numeric-dot",
    "prependParentBulletIndexWithDot": true,
    "indent": 0,
    "component": "Default"
  },
  "children": [
    "ruleRecall",
    "ruleOperationModule",
    "illustrationModule",
    "caselawModule",
    "policyModule",
    "dictaModule"
  ],
  "input-styling": {
    "associationCue": {
      "hidden": false,
      "disabled": false,
      "label": "What issue are you studying?",
      "placeholder": "Battery",
      "value": ""
    },
    "associationStudiable": {
      "hidden": false,
      "disabled": false,
      "value": true
    },
    "associationLocked": {
      "hidden": false,
      "disabled": false,
      "label": "Lock from further editing",
      "value": false
    }
  },
  "chunkSetterType": "mnemonicFlashcard-ruleRecall",
  "primaryContextKey": "topic",
  "stimulusKey": "$thisChunkCue",
  "promptText": "When thinking about this issue, what mnemonic immediately comes to mind?"
}
```

Fig. 25

```json
{
  "context_dependent_placeholder": "An element or factor for this issue's governing test",
  "view-styling": {
    "bulletPrefix": "none",
    "bulletStyle": "numeric-parens",
    "indent": 1,
    "component": "Default"
  },
  "meta-associations": ["source", "shorthand", "mnemonic"],
  "input-styling": {
    "associationCue": {
      "hidden": false,
      "disabled": false,
      "label": "What element or factor applies to this test?",
      "placeholder": "E.g., the intentional . . .",
      "value": ""
    },
    "associationStudiable": {
      "hidden": false,
      "disabled": false,
      "value": true
    },
    "associationLocked": {
      "hidden": false,
      "disabled": false,
      "label": "Lock from further editing",
      "value": false
    }
  },
  "chunkSetterType": "flashcard",
  "primaryContextKey": "topic",
  "stimulusKey": "issue",
  "singleResponsePromptText": "What is the rule or standard you want to immediately come to mind?",
  "firstResponsePromptText": "What is the first element or factor you want to immediately come to mind?",
  "subsequentResponsePromptText": "After recalling $previous, what is the $ordinal of $total elements or factors you want to immediately come to mind?",
  "mnemonicPromptText": "When recalling this issue's governing test, what does $mnemonicKey in $mnemonic stand for?"
}
```

Fig. 26

```
1 {
2   "input-styling": {
3     "associationCue": {
4       "label": "What is your source for this chunk?",
5       "placeholder": "Vosburg v. Putney (Wis. 1891)",
6       "value": ""
7     },
8     "associationStudiable": {
9       "value": true
10    },
11    "associationLocked": {
12      "value": false
13    }
14  }
15 }
16
```

Fig. 27

```json
{
  "input-styling": {
    "associationCue": {
      "label": "What is a shorthand name you can use to remember this chunk?",
      "placeholder": "Mental state",
      "value": ""
    },
    "associationStudiable": {
      "value": true
    },
    "associationLocked": {
      "value": false
    }
  }
}
```

Fig. 28

```json
{
  "input-styling": {
    "associationCue": {
      "label": "What is a mnemonic you can use to remember this chunk?",
      "placeholder": "I or Intent",
      "value": ""
    },
    "associationStudiable": {
      "value": true
    },
    "associationLocked": {
      "value": false
    }
  }
}
```

Fig. 29

```json
{
  "_id": "620f783f00011231bbbcd006",
  "compendiumId": "620164ea2801c700161846a7",
  "userId": "612a710b38d8991043b41970",
  "chunkId": "620f72294b05f800164b04e6",
  "interval": 1,
  "easeFactor": 2.5,
  "due": "Sat Feb 19 2022 04:43:07 GMT-0600 (Central Standard Time)",
  "suspend": false,
  "responses": [
    {
      "_id": "620f783f00011231bbbcd007",
      "grade": "right",
      "date": "Fri Feb 18 2022 04:42:59 GMT-0600 (Central Standard Time)"
    },
    {
      "_id": "620f783f00011231bbbcd008",
      "grade": "right",
      "date": "Fri Feb 18 2022 04:43:05 GMT-0600 (Central Standard Time)"
    },
    {
      "_id": "620f783f00011231bbbcd009",
      "grade": "right",
      "date": "Fri Feb 18 2022 04:43:07 GMT-0600 (Central Standard Time)"
    }
  ],
  "__v": 0
}
```

Fig. 30

```json
{
  "value": [
    {
      "studyToolType": "Flashcard",
      "primaryContextText": "Intentional torts",
      "secondaryContextText": null,
      "stimulusText": " Battery",
      "promptText": "When recalling this issue's governing test, what does I in I HO stand for?",
      "answerText": "[I]The intentional touching of a person, Adams v. Baker (1882) (\"intent element\"); and",
      "chunkId": "620f72784b05f800164b04e9",
      "chunkType": "ruleRecall",
      "lineage": {
        "compendium": {
          "_id": "620164ea2801c700161846a7",
          "cue": "Torts"
        },
        "siblings": [],
        "topic": {
          "cue": "Intentional torts",
          "_id": "620f721c4b05f800164b04e4"
        },
        "issue": {
          "cue": "Battery",
          "_id": "620f72294b05f800164b04e6"
        }
      },
      "interval": 0,
      "due": "Fri Feb 18 2022 04:43:01 GMT-0600 (Central Standard Time)",
      "easeFactor": 2.5,
      "responses": [
        {
          "_id": "620f783f00011231bbbcd005",
          "grade": "right",
          "date": "Fri Feb 18 2022 04:43:01 GMT-0600 (Central Standard Time)"
        }
      ],
      "studySessionResponses": [],
      "status": "inprogress",
      "sessionStreak": 0,
      "studiableId": 1
    },
    {
      "studyToolType": "Flashcard",
      "primaryContextText": "Intentional torts",
      "secondaryContextText": null,
      "stimulusText": " Battery",
      "promptText": "When recalling this issue's governing test, what does HO in I HO stand for?",
      "answerText": "[HO]Such touching was either harmful or offensive.",
      "chunkId": "620f72a74b05f800164b04f9",
      "chunkType": "ruleRecall",
      "lineage": {
        "compendium": {
          "_id": "620164ea2801c700161846a7",
          "cue": "Torts"
        },
        "siblings": [],
```

Fig. 31A

```
 57            "topic": {
 58              "cue": "Intentional torts",
 59              "_id": "620f721c4b05f800164b04e4"
 60            },
 61            "issue": {
 62              "cue": "Battery",
 63              "_id": "620f72294b05f800164b04e6"
 64            }
 65          },
 66          "interval": 0,
 67          "due": "Fri Feb 18 2022 00:00:00 GMT-0600 (Central Standard Time)",
 68          "easeFactor": 2.5,
 69          "responses": [],
 70          "studySessionResponses": [],
 71          "status": "unstudied",
 72          "sessionStreak": 0,
 73          "studiableId": 2
 74        },
 75        {
 76          "studyToolType": "Flashcard",
 77          "primaryContextText": "Intentional torts",
 78          "secondaryContextText": null,
 79          "stimulusText": " Battery",
 80          "promptText": "How does this issue's governing test operate?",
 81          "answerText": "The plaintiff has the burden of proof to establish each
    element of Battery.",
 82          "chunkId": "620f72cb4b05f800164b0507",
 83          "chunkType": "ruleOperation",
 84          "lineage": {
 85            "compendium": {
 86              "_id": "620164ea2801c700161846a7",
 87              "cue": "Torts"
 88            },
 89            "siblings": [],
 90            "topic": {
 91              "cue": "Intentional torts",
 92              "_id": "620f721c4b05f800164b04e4"
 93            },
 94            "issue": {
 95              "cue": "Battery",
 96              "_id": "620f72294b05f800164b04e6"
 97            }
 98          },
 99          "interval": 0,
100          "due": "Fri Feb 18 2022 00:00:00 GMT-0600 (Central Standard Time)",
101          "easeFactor": 2.5,
102          "responses": [],
103          "studySessionResponses": [],
104          "status": "unstudied",
105          "sessionStreak": 0,
106          "studiableId": 3
107        }
108      ],
109      "inputConfig": {
110        "htmlType": "text",
111        "placeholder": "",
112        "label": ""
113      },
114      "validationState": {
115        "status": "",
```

Fig. 31B

```
116      "errorMessage": "",
117      "successMessage": ""
118    }
119 }
120
```

Fig. 31C

TECHNIQUES FOR STORING TESTABLE, SCHEMA-STRUCTURED ASSOCIATIONS AND SYSTEMS AND METHODS IMPLEMENTING SAME

CROSS-REFERENCE TO RELATED APPLICATIONS

The present application claims the benefit of the filing date of U.S. Provisional Application Ser. No. 63/156,255, filed Mar. 3, 2021, the entire teachings of which application is hereby incorporated herein by reference.

TECHNICAL FIELD

The present disclosure generally relates to systems and methods for managing compendiums of information within computer memory using a schema-driven data structure that reduces overall memory footprint using mutable, light-weight association objects.

BACKGROUND

For many years, cognitive scientists and educators lacked a detailed understanding of how students learn. This gap left students and educators to employ a panoply of learning techniques that varied in effectiveness. Technological improvements, however, have since enabled cognitive scientists to study the inner workings of the human brain. This has allowed them to begin filling that gap. That has enabled educators and students to identify the most effective learning techniques. A central problem, though, hampers educators and students from adopting them: Administrability and ability to translate effective learning techniques into computer-readable form.

SUMMARY

In one illustrative embodiment, a system for managing at least one compendium, the at least one compendium comprising a plurality of association objects that collectively provide an information-domain schema for associating cue values with corresponding user-provided responses comprises a memory having the plurality of association objects stored therein, each association object having at least a schema type value, a cue value, and a responses collection to store one or more association objects corresponding to the cue value; and a controller. At least one first association object of the plurality of association objects with an undefined response is identified based on the responses collection of the first association object. A first user-editable placeholder is caused to be visualized on a display to a user based on identifying the first association object with the undefined response. User input is received based on the first user-editable placeholder. At least a second association object is instantiated within the memory based on the user input. A representation of the second association object is caused to be visualized on the display to the user and a second user-editable placeholder to be visualized on the display adjacent the representation of the second association object based on the schema type value of the at least one first association object.

In another illustrative embodiment, at least one first association object of a plurality of association objects is identified with an undefined response based on a responses collection of the first association object. A first user-editable placeholder is caused to be visualized on a display to a user based on identifying the at least one first association object with the undefined response. User input is received based on the first user-editable placeholder. At least a second association object is instantiated within a memory based on the user input. A representation of the second association object is caused to be visualized on the display to the user and a second user-editable placeholder to be visualized on the display adjacent the representation of the second association object based on a schema type value of the at least one first association object.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements, and have been solely selected for ease of recognition in the drawings:

FIG. 1 shows an example process for management of a compendium consistent with the present disclosure.

FIG. 2 shows an example process for displaying testing tools generated from a compendium consistent with the present disclosure.

FIG. 3 shows one example process/workflow suitable for use during the example process of FIG. 1, in accordance with aspects of the present disclosure.

FIG. 4 shows one example process/workflow suitable for use during the example process of FIG. 2, in accordance with aspects of the present disclosure.

FIG. 4 shows an example user interface that visualizes at least a portion of a compendium consistent with the present disclosure.

FIG. 5 shows the example user interface of FIG. 1 configured to receive user input via at least one user-editable control consistent with aspects of the present disclosure.

FIG. 6 shows another example of the user interface of FIG. 5 while receiving user input consistent with aspects of the present disclosure.

FIG. 7 shows another example of the user interface of FIG. 5 after updating the compendium based on user input, in accordance with aspects of the present disclosure.

FIG. 8 shows another example of the user interface of FIG. 5 in accordance with aspects of the present disclosure.

FIG. 9 shows another example of the user interface of FIG. 5 in accordance with aspects of the present disclosure.

FIG. 10 shows an example user interface of FIG. 5 that visualizes at least a portion of a compendium consistent with the present disclosure.

FIG. 11 shows another example of the user interface of FIG. 5 in accordance with aspects of the present disclosure.

FIG. 12 shows an example user interface of FIG. 5 that visualizes at least a portion of a compendium consistent with the present disclosure.

FIG. 18 shows example class object definitions suitable for representing compendium data in memory, in accordance with aspects of the present disclosure.

FIG. 19 shows example class object definitions suitable for representing schema data in memory, in accordance with aspects of the present disclosure.

FIG. 20 shows example class object definitions suitable for representing study data in memory, in accordance with aspects of the present disclosure.

FIGS. 21A-21C collectively show one example compendium formatted in JavaScript Object Notation (JSON) in accordance with aspects of the present disclosure.

FIGS. 22A-22D collectively show another example compendium formatted in JSON in accordance with aspects of the present disclosure.

FIG. 23 shows one example of a compendium object's schema formatted in JSON in accordance with aspects of the present disclosure.

FIG. 24 shows another example of a compendium object's schema for an example "topic" association object formatted in JSON in accordance with aspects of the present disclosure.

FIG. 25 shows another example of a compendium object's schema for an example "issue" association object formatted in JSON in accordance with aspects of the present disclosure.

FIG. 26 shows another example of a compendium object's schema for an example "ruleRecall" association object formatted in JSON in accordance with aspects of the present disclosure.

FIG. 27 shows another example of a compendium object's schema for an example "source" association object formatted in JSON in accordance with aspects of the present disclosure.

FIG. 28 shows another example of a compendium object's schema for an example "shorthand" association object formatted in JSON in accordance with aspects of the present disclosure.

FIG. 29 shows another example of a compendium object's schema for an example "mnemonic" association object formatted in JSON in accordance with aspects of the present disclosure.

FIG. 30 shows another example of a study data object formatted in JSON in accordance with aspects of the present disclosure.

FIGS. 31A-31C collectively shows an example aggregation of a compendium object and study data objects in accordance with aspects of the present disclosure.

DETAILED DESCRIPTION

Figure 13:
FIG. 13 shows the example user interface of FIG. 2 configured to receive user input via at least one user-manipulable control consistent with aspects of the present disclosure.

Cognitive scientists now understand how students store what they learn in their long-term memory. They have discovered that such memory is "associative." That means that a person stores information in associative pairs: A cue followed by one or more responses. When a student's mind receives a cue, their automatic system (e.g., subconscious) automatically retrieves the associated response or responses.

A law-school course on torts provides one apt example. Suppose the professor asks a student, "Please define battery." That question is a cue. This automatically triggers the definition of battery in the student's mind. The student would then answer: "Professor, battery is a tort that is established using a two-part test. The plaintiff must establish: (1) an intentional touching; and (2) such touching is either harmful or offensive. If successful in proving battery, the plaintiff can get money damages from the wrongdoer."

Cognitive scientists' understanding of the learning process, of course, goes much deeper. The example above labeled the professor's question as a "cue" and the student's answer as a "response," but such labels merely describe the relationship between the two. In the abstract, both the question and the individual elements are discrete ideas. In other words, they could also be described as "chunks." Because human memory is associative, chunks can serve both as a cue and a response. Sticking with the previous example, when the law student recites the second element of battery—"such touching is either harmful or offensive"—that act of recall will also likely cue the student's mind to recall another chunk: that, in most states, whether a touching is harmful or offensive depends on what a reasonable person would think. That a student's long-term memory is associative carries with it three important implications for increasing the efficacy of student learning.

First, it means that students must manage their learning at the association level. Understanding that each chunk can serve both as a cue and a response means that associations nest within other associations. This is somewhat analogous to a nonrelational database structure in computers, where individual records are stored within other records and querying of data can leverage defined relationships, i.e., the schema, between those records. Therefore, it is not enough for a student to merely memorize individual chunks. The student must also memorize those chunks as responses to one or more cues. Only then will such chunks be retrievable by the student's memory system.

Second, because associations nest within each other, students must structure their associations using "mental schemas": abstract patterns that describe how associations nest within each other. Recalling the example on battery, the student there used a mental schema to structure battery's associations. The first step in their answer was to recall that battery was "a tort." A tort is a mental schema. Its starting cue is its name ("battery"). Its associated responses can include the test used to establish a wrongdoer's liability, who bears the burden of proving that test, and what the plaintiff recovers if she proves the tort in court. Each of these responses are also cues for their own associated chunks. Here, for instance, the student applied the mental schema for a tort in their answer. The student recalled that the plaintiff bears the burden of proof. Then the student recalled the test for establishing battery, which has two elements. Finally, the student recalled that money damages are the remedy.

Mental schemas are relevant in all information domains/ subjects. For instance, a student taking a course in national security might need to learn the strengths and weaknesses of different countries in the event of war. Many such students use a mental schema to do so—DIME: Diplomacy, Information, Military, and Economics. Likewise, a student-doctor may need to learn a vast number of associations that relate to different diseases. They often find it useful to structure them by applying a mental schema to each disease: for example, signs and symptoms, causes, method to confirm a diagnosis, and treatment protocol.

Third, it means that students must have a method to systematically test their associations. Known as the "forgetting curve," learned associations are rapidly forgotten if they are not practiced. Students can practice them, however, by using learning tools like flashcards, multiple-choice questions, and short-answer essays. Students that use such tools to practice their associations will both remember the practiced associations longer (the "lag effect"), and also make new associations automatically (known as "transference"). These benefits, and others, are collectively known as the "testing effect."

Despite having this three-part roadmap to making students' learning more effective, students are unable to adopt it largely for reasons of administrability. For instance, students face an extraordinarily complex task in that they receive associations to learn from a plurality of sources. Students read for class; reading that often spans multiple required and/or optional texts. They attend class. They participate in study groups. They go to a professor's office, and so on. Each source either gives the student new associations to learn, gives them duplicate associations, or changes the student's understanding of existing associations. Further, the total number of associations a student is responsible for quickly compounds. By the end of the semester, it is not uncommon for a student to be responsible for thousands of associations in each course.

Moreover, most students do not have ready access to mental schemas to help them accurately combine these competing associations, or they use mental schemas that may not necessarily be effective depending on the information domain. Most educators do not teach students about relevant mental schemas. Without such assistance, it is often impossible for students to derive relevant mental schemas on their own. Leaving aside the time it takes to think critically about a course to see its underlying mental schemas, a chicken-and-the-egg problem remains. To reduce a course to its underlying schemas often requires having first mastered all the course's content. Yet a student achieves such mastery only (if ever) at the end of the semester. Because she will never take that course again, it makes little sense to spend time reducing it to its schemas.

Finally, even if the student were to know and apply relevant mental schemas to consolidate and organize her associations, a final challenge remains that will prevent her from taking full advantage of the testing effect. Tools for testing associations—like flashcards, multiple-choice questions, and essay prompts—do not make themselves. It takes time to make them; time busy students and educators often lack. Additionally, making them effectively takes specialized knowledge that most students, and some educators, lack. The result is that, unfortunately, most educators either do not make such tools for their students or do not make them with sufficient breadth to cover all the associations that their students are responsible for in a course.

Accordingly, there is a need for systems and methods that allow students to reduce preferably all a course's competing associations into a single compendium that can be efficiently represented within memory. In particular, there exists a need for systems and methods for managing a compendium of information that allows for editing of previously recorded associations over time, e.g., as a student's understanding of a topic increases. In addition, the systems and methods must preferably eliminate reliance on a student for self-structuring of associations. Instead, the systems and methods should preferably structure the associations in a manner that ensures that user-input/editing is performed in a manner which comports with schema-imposed constraints at the time of input. Also, the systems and methods should preferably allow for dynamic generation of testing sequences from the most up-to-date associations in a compendium without necessarily relying on a separate/external testing databases. Accordingly, the generated test sequences ensure that a user can be tested on relevant or "studiable" concepts rather than potentially be presented with test sequences which include irrelevant or otherwise unknown cues and associated responses.

In other words, there exists a need to provide systems and methods which feature Testing-Enabled, Schema-Structured Associations (T.E.S.S.A.) to improve the operation of computer systems used in an academic context. Moreover, there exists a need for techniques for representing a compendium of information within a memory which includes a relatively small memory footprint and can be efficiently traversed by a processor/controller, e.g., computing device 3210 from FIG. 32 below, in a manner that avoids unnecessary processor cycles while still allowing for user-driven dynamic updates to a compendium represented in memory and dynamic generation of test sequences. Thus, devices with relatively constrained resources, such as a smartphone/laptop which is battery operated and "Chromebook"-type computers with reduced CPU, memory and hardware resources can be used by a user to generate, update, and manage virtually an unlimited number of compendiums (e.g., including local and/or remote "cloud" storage of compendiums) without sacrificing the user experience such as through an unresponsive user interface and/or through power drains caused by high processor use.

Thus, an aspect of the present disclosure includes systems and methods for managing at least one compendium, the at least one compendium comprising a plurality of association objects that collectively provide an information-domain schema for associating cue values with corresponding user-provided responses. The system further preferably comprises a memory having the plurality of association objects stored therein, with each association object preferably having at least a schema type value, a cue value, and a responses collection to store one or more response objects (which may also be referred to herein as chunk objects) corresponding to the cue value, and a controller (e.g., such as an x86/x64 processor). The association objects preferably include a schema type value that allows for association objects to self-describe constraints such as the types of response objects that can be linked with an association object. Preferably, such links are based on the responses collection within each association object. Compendium workflows/processes such as the addition of association objects based on user input can include the controller automatically, e.g., without user interaction, causing N number of user-editable placeholders to be visualized based on the aforementioned schema type value. A user may then interact with the user-editable placeholders, e.g., via a mouse or other pointer device such as their finger, to input data and also preferably set a flag/value that indicates the same is "studiable." Advantageously, this "studiable" flag may then be used by the controller to generate a test sequence that targets data relevant to topics likely to be tested during an exam. Preferably, the association objects are stored in a memory in a human-readable format such as JSON.

In one preferred example, a compendium-management workflow consistent with the present disclosure includes the controller being configured to identify at least a first association object of the plurality of association objects with an undefined response based on the responses collection of the first association object. The controller is then preferably configured to cause a first user-editable placeholder to be visualized on a display to a user based on identifying the first association object with the undefined response and receive user input from the user based on the first user-editable placeholder. The controller then preferably instantiates at least a second association object within the memory based on the received user input and causes a representation of the second association object to be visualized on the display to the user. In addition, the controller also further preferably causes a second user-editable placeholder to be visualized on the display adjacent the representation of the second association object based on the schema type value of the at least one identified association object.

Various compendium management workflows consistent with the present disclosure can be implemented on computer device via an internet browser or an "app" executed on the computer device. The computer device can comprise, for example, a laptop, smart phone, or a tablet PC. The computer device preferably communicates with a computer server via a wide area network (WAN), e.g., the Internet, for purposes of retrieving compendium data and submitting user changes to compendium data, for example. The computer server can include a database to persist compendium data, with the database being, for example, implemented as a MongoDB database offered by MongoDB Inc., although other database implementations are within the scope of this disclosure. In some embodiments, the database is information repository 3214 from FIG. 32 below.

As discussed above, compendium management workflows consistent with the present disclosure can be implemented within a native application or "app" on smart phones, tablets, or desktop (e.g., non-mobile) computers. Further, compendium data can be stored locally on a user's computer device, in an internet browser's local storage, in "cloud" storage, and/or on removable media, such as, but not limited to, external hard drives, USB flash drives, DVDs, CDs, floppy disks, etc. Compendium management workflows consistent with the present disclosure may be implemented using the computer language JavaScript, although other languages are equally applicable and are within the scope of this disclosure. Some such example programming languages include, but are not limited to, Python, C, and C++.

As used herein, "compendium" refers to a plurality of associations that is structured in memory and capable of visual display on a display device using schemas.

"Schema" refers to a predefined template/definition that is associated with a particular type of association, cue, response, chunk, compendium, and/or generated test sequence. Schemas can be used to type-define objects such as association objects for defining constraints that are utilized for purposes of data manipulation by a user and/or to display/visualize compendium data.

As used herein, the term "association object" (which may also be referred to herein as simply associations) refers to a data structure that includes a cue value, and preferably a single cue value, and one or more linked response objects stored preferably within a responses collection within each association. Such association objects may also be referred to herein as chunk objects or simply chunks. Such chunk objects refer to a discrete idea/concept that can be represented visually and/or via auditory samples. Some such examples of chunk representations include, but are not limited to, text, sound, image(s), and/or video.

"Cue value" or simply "cue" refers to a prompt that can be represented visually and/or through auditory samples (e.g., sound files). Some such cue representations include, but are not limited to, text, sound, images, and videos. Preferably, the cue representations are interactive such that a user selecting a cue representation via a pointer device such as a mouse causes the computer device to retrieve and visualize one or more linked response(s) on a display.

"Response object" or simply "response" refers to an association object by reference to its link with a particular cue.

"Test sequence" refers to a sequence which is capable of being instantiated in memory and presented on a display for purposes of receiving user input and validating that input based on pre-defined responses stored within a compendium. Such test sequences may also be referred to herein as "testing tools." Testing tools preferably include visual elements such as text, images, and videos that can facilitate a user learning one or more associations. Test sequences can also include audio samples such as sound files. Some preferred example test tools include virtual flash cards, multiple choice questions, short answers, just to name a few.

In operation, a user executes an "app" or loads a website via a computer device, and more preferably, an Internet-connected computer device. The user is then preferably able to create a new compendium and select an existing schema for the new compendium or create a new schema. For example, an undergraduate student may create a compendium for her U.S. History course using a generic schema that could be used to structure any subject's knowledge.

Many students, however, will opt to select subject-specific schemas (which may also be referred to herein as information-domain schemas) when they create a new compendium. For example, a law student would likely select a law-school-specific schema for her compendium(s). A student-doctor, however, may have a wide variety of subjects in medical school. For example, anatomy, biochemistry, and ethics. She may use a first schema for her anatomy compendium, and a second schema for her biochemistry compendium, and a third schema (such as a generic schema) for her ethics course. Aspects and features of the present disclosure enable this flexibility for users and maintainability for developers by preferably using a two-step approach: First, a common object class is used by a computer device to preferably store all compendia data on a persistent storage server (as discussed further below); and second, the computer device configures the display and user-manipulation of these compendia objects through the use of schemas.

One such example common object class for storing compendium data on persistent storage servers is shown in FIG. 18. In particular, FIG. 18 shows preferred example definitions of compendium-class objects. Specifically, instantiated compendium objects preferably contain information about the compendium itself as object properties 18.1. For example, the name of the professor that is teaching the course that the compendium is based on. Users can also store unique identifiers for collaborators of varying permission levels in the compendium's properties. In one preferred example, users can store unique identifiers for other users in the compendium's "owners," "editors," and "viewers" properties 18.1 to enable and control collaborator access. Such owners, editors and viewers may be instantiated in a lookup table in memory during operation.

Compendium objects also preferably include an "associations" property that will contain a plurality of association objects. The associations property may also be referred to herein as an associations collection. Once instantiated in a memory, these association objects preferably contain information about the association object itself; such as its type (or schema type), cue (or cue value), and responses 18.2 (or response object) as object properties. Specific to its responses, an association object's responses property preferably contains a plurality of association objects, which may also be referred to herein as chunk objects or simply chunks.

It should be noted that the compendium objects are mutable and recursive such that a compendium can include plurality of association objects, the plurality of association objects can include plurality of association objects in their responses collection. This pattern of association objects nested within association objects can be advantageously used to allow the user to nest associations without limit, and in a memory-efficient manner.

Association objects preferably include a studiable property/flag 18.2 that is unique/specific the association object. This studiable property can be used by computer device to allow a user to study the concepts/data of the association object during testing sequences/work flows consistent with the present disclosure. In addition, association objects also preferably can link to study-data object that store user study data for the association object FIG. 20.

The study-data object 20.1 preferably stores a plurality of instantiated graded-response objects 20.2. To link each study-data object to a single association object, each study-data object preferably stores the compendium object's unique identifier in a "compendiumId" or similar property 20.1. Further, it preferably stores the precise association object's unique identifier in a "chunkId" or similar property 20.1. To link each study-data object to a single user, each study-data object preferably stores the user's unique identifier in a "userId" or similar property 20.1. In this way, multiple users can potentially study the same association object and record their study data without interfering with other users' study data because each has her own user-study-data object to store study data within. An example of an instantiated study-data object is in FIG. 30.

Study-data objects preferably store the information that governs the use of study tools when performing test sequences/workflows consistent with the present disclosure. For instance, the study-data object can include a date for when the user is next "due" to study the response object 20.1. Study-data objects preferably also store the state of the user's learning for that response object in "interval" and "easeFactor" or similar properties 20.1. Finally, and preferably, every graded response 20.2 a user has ever input while studying a given association object stored in the study-data object's "responses" property 20.1.

These graded-response objects, once instantiated in memory, can store information about user responses while studying via test sequences/workflows consistent with the present disclosure. For instance, such stored data can include the user's "grade" for the test sequence and "date" and time the user performed the test sequence 20.2. The computer device preferably uses these graded-response objects as the raw data for algorithms/workflows consistent with the present disclosure that calculate and manipulate the study-data object's properties that govern when an association object is next due to be studied.

For a compendium that has already been instantiated in memory, FIG. 1 shows an example access/initiating workflow that starts at 1.0. The initiating workflow may also be referred to herein as a compendium initiating process or simply an initiating process. In this example, a user can begin the initiating process by clicking a hyperlink that represents a single compendium, for example. Clicking the hyperlink can cause the user's computer internet browser to navigate to that compendium's webpage. Once navigation is complete, the initiating process gets/retrieves the compendium associations at 1.1.

Retrieving the compendium associations at 1.1 can include the computer device sending a request to a persistent-storage database located on a remote computer server. The request can be for the specific compendium's data. In response, the remote computer server can return an object that is structured using, preferably, JSON. The JSON object preferably contains all the compendium's associations and includes links to corresponding external resources. Such external resources could include, but are not limited to, text, sound, images, and videos that are not stored necessarily stored in the persistent-storage database that includes the retrieved JSON object. FIGS. 21A-21C collectively show one such example JSON object. FIGS. 22A-22D show another such example JSON object. In particular, the JSON Object of FIGS. 21A-21C and FIGS. 22A-22D are implemented as compendium-class objects that comports with the object definitions shown in FIG. 18. Preferably, the JSON Object of FIGS. 21A-21C and FIGS. 22A-22D are used by a computer device to visualize compendium data via an internet browser or "app" for example, such as shown in FIGS. 9 and 11, respectively.

Continuing with FIG. 1, the initiating process continues to 1.2. After the computer device receives the compendium object preferably implemented as a JSON object, as discussed above, the computer device can cause at least a portion of the compendium to be visualized on a display to a user by structuring the compendium object's associations in accordance with instantiated schema-class object(s) 1.2. One such example schema-object class is illustrated in FIG. 19. The use of these objects and the structuring process is discussed below with reference to FIG. 3. Examples of this process's outputs in one preferred example implementation are shown in FIGS. 9 and 11.

After visualizing at least, a portion of the compendium's schema-structured associations, the computer device can then "listen" for user actions in 1.3. Such actions can involve the user using a computer mouse to click on various buttons/user interface elements. In doing so, the user can manipulate an association 1.4. Alternatively, or in addition, a user can initiate actions using finger or stylus taps on a touchscreen, voice commands, commands from a brain-computer interface, or commands generated programmatically. Such taps or commands could be directed at buttons, links, or some other device for capturing and initiating such actions; for example, but not limited to, a natural-language processor that listens for the user to speak a command as part of the action-initiation process.

A user can manipulate associations in 1.4 in one or more ways. Some such example manipulations include (1) creating new associations; (2) changing how associations are displayed; (3) updating existing associations; and/or (4) deleting existing associations.

In one example, a user can create new associations in 1.4 by clicking on a context-dependent placeholder (CDP). The CDPs may also be referred to herein as user-editable placeholders or user-editable controls. These CDPs are preferably generated during a process/workflow for displaying schema-structured associations 1.2, one example of which is discussed further below with reference to FIG. 3.

One preferred use of the CDPs is to prompt the user to input different types of associations into their correct places within the compendium based on schema-defined constraints. By way of example, if a user's compendium uses a law-school schema, CDPs can exist to prompt the user to "Add an issue." Upon adding an issue, the computer device can use the compendium's schema object to dynamically generate further CDPs that represent nested associations within that issue. For example, suppose the user added a new issue she labeled "Battery." The computer device will then preferably generate new CDPs to prompt the user to generate/input the relevant associations she needs for that issue. For example, FIG. 5 shows a preferred implementation of this process in the context of a law-school schema, with one CDP, among others, prompting the user to add "An element or factor for issue's governing test" 5.01. By using this CDP, a user can add the elements of battery as discussed above.

Another CDP can ask/prompt the user to "Add a prompt to work on some illustrations." Such a CDP can allow the user to record short stories that demonstrate how battery operates in practice. Additionally, CDPs can also, where appropriate/desired, be generated to prompt the user to input additional associations that are context dependent. By way of example, FIGS. 6 and 7 demonstrate how the computer device can prompt a user to input additional associations while and after inputting the first element of battery. Alternatively, or in addition, such CDPs could also be implemented using auditory prompts.

Preferably, upon clicking/selecting the CDP by the user, the computer device provides the user with a structured-input interface (SII), e.g., FIG. 6. Preferably, each SII is a form that the user can fill out/enter data into. The form itself can further prompt the user to input information that corresponds to the precise/target type of association that the user is manipulating. By way of example, suppose that a user clicked a CDP to "Add an element or factor for this issue's governing test" under the issue "Battery." The computer device can provide the user with an SII to input such an element. Further, the SII itself can remind/guide the user to input data corresponding to the SSI in the form of a visual prompt such as an input field that provides a string such as "What element or factor applies to this test," or "What is your source for this chunk." By way of example, one such implementation is shown in FIG. 6.

FIGS. 7-12 show additional examples of the user interface of FIG. 5. FIG. 7 shows another example of the user interface of FIG. 5 after updating the compendium based on user input, in accordance with aspects of the present disclosure. FIG. 8 shows another example of the user interface of FIG. 5 in accordance with aspects of the present disclosure. FIG. 9 shows another example of the user interface of FIG. 5 in accordance with aspects of the present disclosure. FIG. 10 shows an example user interface of FIG. 5 that visualizes at least a portion of a compendium consistent with the present disclosure. FIG. 11 shows another example of the user interface of FIG. 5 in accordance with aspects of the present disclosure. FIG. 12 shows an example user interface of FIG. 5 that visualizes at least a portion of a compendium consistent with the present disclosure.

Alternatively, such SIIs can be provided through alternative controls/approaches. By way of a non-limiting example, such alternative approaches can include prompts for the user to input media, such as audio recordings, images, or videos; and/or prompts for the user to tag particular points on an image or within a video. Such prompts and examples can be any combination of text, images, video, audio, or brain-computer interactions.

In one preferred example, a user can change/modify how association objects are displayed/visualized by manipulating buttons of a control bar. By way of example, a user could manipulate a toggle that causes execution of a test sequence/process or a "read" mode process/workflow. One example of executing the read mode preferably includes the computer device automatically hiding all of the CDPs (e.g., removing them from the display) to enable the user to read/study and interact with her compendium without distraction. Example of this implementation are shown FIGS. 10 and 12.

The computer device may also be configured to enable the user to display associations of only select/target types. For example, in a compendium for a law-school course, a user could manipulate a button that would cause the computer device to display only legal rules. In such a case, other types of associations—such as illustrations, judicial opinions, policy, and any other user-defined associations—are preferably hidden from the user's view. Further, the computer device can also display a compendium's associations in non-traditional formats, to include, but not limited to, flowcharts and mind maps with the click of a button/other user interface element.

In one example, a user can update existing associations by clicking (directly) on existing associations, and more particularly, representations of existing associations visualized on a display. This preferably causes the association's SII to appear (e.g., as a modal dialog box), with the difference that the SII's content input field is preferably to be completed with the association's actual content FIG. 6. A user may then be able to update the association as needed. Alternatively, or in addition, a user may perform such updates through voice command or brain-computer interface.

In one example, a user can delete existing associations by first clicking (directly) on them, and more particularly, a representation of existing associations visualized on a display. Next, the user can click a button that represents the delete operation. Alternatively, the user can delete existing associations by selecting them with a keyboard command or mouse click and then striking the "DELETE" key on the user's keyboard. Alternatively, or in addition, a user may perform such deletions through voice command or brain-computer interface.

In any such cases, a user manipulating an association at 1.4, can save the change(s) to the compendium at 1.5. The computer device may then retrieve the compendium's associations again at 1.1, followed by the display schema-structured associations 1.2 to visualize at least a portion of the updated compendium and then return to listening for user actions at 1.3.

FIG. 3 shows one example compendium workflow consistent with the present disclosure. In particular, FIG. 3 illustrates one example process for visualization at least a portion of a compendium which begins at 3.0.

Note, the computer device getting/retrieving the compendium's associations 1.1, as discussed above with reference to FIG. 1, preferably serves as the initiating/precondition to executing the example process/workflow of FIG. 3.

As shown, the computer device preferably selects the compendium's schema at 3.1. In one example, this includes retrieving from the compendium's JSON object a stored value that specifies what type of schema the compendium uses. For example, the compendium's type in FIG. 21A at line number 6 is set to the value "marshall." The computer device then preferably retrieves data corresponding to that identified schema from its program files, which may also be referred to herein as a schema definition file. Alternatively, or in addition, the schema definition file can also be stored external to the computer device, such as in the same persistent-storage database that the JSON object is stored in.

After retrieving the compendium's schema, and more particularly the associated schema definition file, the computer device preferably uses the same to structure the compendium's visualized portions. It preferably does that by using the compendium's schema object to determine which associations to display next from the compendium's associations property. In one example, this includes the computer device using the schema object's "children" property 19.1 (See FIG. 19) to determine the ordering. The children property preferably contains an ordered array/list of association types that the computer device uses to prioritize which associations within the compendium object's associations property to display, and in which order. By way of example, the compendium's schema object's children property can contain a single value of "topic" within its array/list. In this example, the computer device then searches/iterates through the compendium object's associations property in memory for all associations of type "topic." The computer device can then select and manipulate the found associations in, preferably, the order the computer device finds them in 3.2 (See FIG. 3). By way of example, the computer device's default configuration can cause the computer device to then select the "Intentional torts" topic (See line 18 in FIG. 21A) prior to selecting remaining association objects of type topic, if any. The computer device can determine if an association is missing in 3.3 by comparing the contents of the compendium object's associations property to its schema object's children property that was selected in 3.1.

If an association is missing at 3.3, then the computer device can select the association's schema object and visualize a CDP at 3.6. Once the CDP is displayed/visualized, the computer device can use the compendium's schema object to select the next association at 3.2.

On the other hand, if the association is not missing 3.3, then the computer device can select the association's schema object and display/visualize a representation of its cue at 3.4. In one example, selecting the association's schema object can be an identical or substantially similar process to how a compendium's schema object is selected, the description of which will not be repeated for brevity.

Each association object preferably includes a stored value that specifies its schema type (which may also be referred to herein as a schema type value). The computer device can use the schema type value to retrieve the association's matching schema. Example object definitions for the schema are shown in FIG. 19, and one example instance of a topic schema definition comporting with the object definition of FIG. 19 is shown in FIG. 24. By way of example, the type property for the "Intentional torts" association on line 18 in FIG. 21A includes the schema type value set to "topic". The word "topic" represents the schema that the object uses for structuring its visual display and operation. Once the computer device has retrieved the association's schema, the computer device can use it to display/visualize a styled cue based on the schema-object's view-styling property 19.1, 19.2 (See FIG. 19).

After the computer device selected the association's schema and displayed/visualized its cue at 3.4, the computer device can then use the association's schema object's children property 19.1 (See FIG. 19) to select the next association object 3.5 from its responses property/collection. In one example, ordering and selecting the next association object can be an identical or substantially similar process to how a compendium's schema object selects the next association, the description of which will not be repeated for brevity. If the computer device determines the association object is missing at 3.7, the computer device may then select the association object's schema object and display a CDP 3.8. This "missing" association object may also be referred to herein as an undefined response. As previously discussed, CDPs enable a user to manipulate an association object. The computer device can then use the association object's schema object to select the next response at 3.5.

On the other hand, if the computer device determines the association object is not missing at 3.7, the computer device can select the association object's schema object at 3.4. Depending on the schema and what content the user has stored within the compendium, this could mean continuing to an association that is nested within the association object. Alternatively, or in addition, selecting the next association could mean the computer device moving/traversing all the way back up to top/root of the compendium within the memory and selecting the next association from this top/root level position. In any event, this sequence/pattern of looping/iterating through association objects (and then back again) can continue until, for example, some or the entirety of the compendium object has either been displayed/visualized or displayed with a CDP. Additional example schema objects are in FIGS. 23-29.

The user is not limited to only manipulating associations of compendium and may optionally execute a study mode/process. FIG. 2 illustrates one example study-mode workflow/process consistent with aspects of the present disclosure. For example, a user can begin the study mode/process by clicking a hyperlink that represents a single compendium's testing tools, for example. Clicking the hyperlink can cause the user's computer internet browser to navigate to that compendium's study-mode/process webpage. Once navigation is complete, the initiating process begins at 2.0 and then gets/retrieves the compendium associations and study-data objects at 2.1. Once retrieved, the study mode/process will combine association objects and study-data objects with the association object's schema object into aggregations 2.2, preferably stored in local memory.

Figure 14:
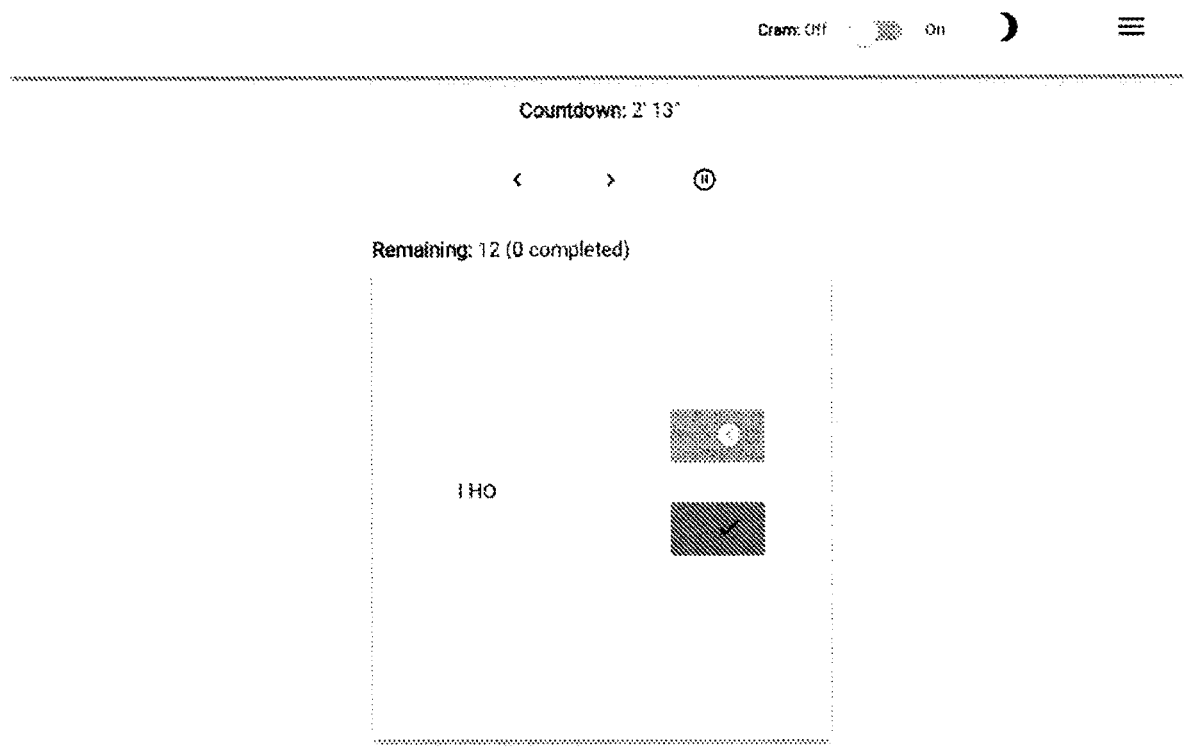
FIG. 14 shows another example of the user interface of FIG. 13 after updating the testing tool based on user input, in accordance with aspects of the present disclosure.
Figure 17:
FIG. 17 shows another example of the user interface of FIG. 13 in accordance with aspects of the present disclosure.

FIGS. 13-17 show additional examples of the user interface of FIG. 2. FIG. 13 shows the example user interface of FIG. 2 configured to receive user input via at least one user-manipulable control consistent with aspects of the present disclosure. FIG. 14 shows another example of the user interface of FIG. 13 after updating the testing tool based on user input, in accordance with aspects of the present disclosure. FIG. 17 shows another example of the user interface of FIG. 13 in accordance with aspects of the present disclosure.

FIG. 4 illustrated one example workflow/process for building the aggregations in 2.2, starting at 4.0. This can include the computer device comparing the user study mode preferences and/or previous study mode data. In one preferred example, this includes the computer device identifying one or more associations and/or response objects with a corresponding "studiable" value set to enabled/TRUE (See, e.g., line 33 in FIG. 21A). As part of the initiating process in 4.0, the computer device will select the first association object in the compendium object's associations collection 18.1, 18.2. It will then use the association object's type value 18.2 to select the appropriate schema object FIG. 19. Next, at 4.2, the computer device will use the schema object to select other schema-required data from the instantiated compendium object.

By way of example, a compendium object of type "marshall" (a law-school compendium), could have a nested association object of type "ruleRecall," as shown on line 64 in FIG. 21B. An example schema object for a ruleRecall association object is in FIG. 26. The schema object specifies that a "flashcard" is the preferred testing tool for ruleRecall association objects at line 30 in FIG. 26. Additionally, the schema object requires: a "primaryContextKey" from the ruleRecall's "topic," line 31; "stimulusKey" of "issue," line 32; and a "subsequentResponsePromptText" value that requires a "$previous" and "$total" value, line 35. The computer device would use those schema-object requirements to select "Intentional torts" from the compendium object at line 18, FIG. 21A as the corresponding "topic" for the "primaryContextKey"; "Battery" from the compendium object at line 25, FIG. 21A as the corresponding "issue" for the "stimulusKey"; "The intentional touching of a person; and" from the compendium object at line 32, FIG. 21A as the "$previous"; and the number "2" as the "$total" by counting the total number of association objects of type "ruleRecall" that are nested within the type "issue" parent association object's responses collection. (See lines 28-128, FIGS. 21A-21C.)

Next, at 4.3, the computer device will complete the testing tool's aggregation and store it, preferably in local memory. If study-data objects FIG. 20 associated with the aggregation's association object exist, then it will be added, and the aggregation updated, prior to the aggregation being stored in memory. By way of example, FIG. 30 shows an example, instantiated study-data object with three graded-response objects, with a "chunkId" value of "620f72294b05f800164b04e6" at line 5. This study-data object corresponds with the association object of type "issue" at line 23 of FIG. 21A. Once this optional update is complete, the aggregation will be stored 4.3 and the workflow/process for building that testing tool's aggregation will stop 4.4, before beginning again for the next association object in the compendium (if any) at 4.0 until all testing tool aggregations have been built. An example collection of testing-tool aggregations is included at FIGS. 31A-31C.

Figure 15:
FIG. 15 shows another example of the user interface of FIG. 13 in accordance with aspects of the present disclosure.
Figure 16:
FIG. 16 shows another example of the user interface of FIG. 13 after updating the testing tool based on user input, in accordance with aspects of the present disclosure.

The computer device will then begin to listen for user actions 2.3. If the user begins to study 2.4, then the computer device will display appropriate testing tools 2.5 using the testing-tool aggregations stored in memory 2.2. In the event one or more testing tools are available for studying, the computer device executes a sequence for presenting each to the user for studying. By way of example, the testing-tool aggregation at line 4, FIG. 31A, requires a "studyToolType" of "Flashcard." A preferred example of implementing a flashcard for this testing tool is shown in FIG. 15 (for the flashcard's front), and FIG. 16 (for the flashcard's back). However, different testing tool types can also be implemented or selected by the user as a preference. For example, multiple-choice questions or short-answer essays could also be used.

The computer device will then process user actions and display the testing tools until the user stops studying 2.6, which could be due to the user manually stopping or pausing the study session, or the user completing all available testing tools for that session. After the user stops studying 2.6, the computer device will save the study data from that study session and perform necessary updates to the testing-tool aggregations. If there are testing tools remaining to be studied 2.8 (for example, if the user merely paused the study session, or if the study session was set to only display a portion of all available testing tools to the user), then the computer device will resume listening for user actions 2.3. If not, then the study-mode workflow/process will stop 2.9.

One example system or method for managing a compendium that exemplifies features and aspects of the foregoing will be discussed.

In a first example, a system for managing at least one compendium is disclosed. The at least one compendium comprises a plurality of association objects that collectively provide an information-domain schema for associating cue values with corresponding user-provided responses. One such example compendium implemented by a JSON object is shown in FIGS. 21A-21C.

The system is preferably implemented as a computer device such as a smart phone, laptop, or tablet computer. The system further preferably includes a memory having the plurality of association objects stored therein. Preferably, each association object includes at least a schema type value, a cue value, and a responses collection to store plurality of association objects that relate to the cue value.

The system further preferably includes a controller implemented as a processor such as an x64 processor. The controller is preferably configured to identify at least a first association object of the plurality of association objects with an undefined response based on the responses collection of the first association object. For example, this can include the controller traversing the JSON object for the compendium and determining if, for example, the responses collection shown at line 21 of FIG. 21A does not include any response objects, e.g., is empty/has zero response objects stored therein.

The controller is further preferably configured to cause a first user-editable placeholder to be visualized on a display, and more particularly a user interface visualized on the display, to a user based on identifying the first association object with the undefined response. One such example of the user interface is shown in FIG. 5. In the example of FIG. 5, the at least one user-editable placeholder 5.01 is visualized. More preferably, and as shown in FIG. 5, a plurality of such user-editable placeholders is visualized.

FIGS. 23-29 show additional examples of a compendium object's schema format. FIG. 23 shows one example of a compendium object's schema formatted in JSON in accordance with aspects of the present disclosure. FIG. 25 shows another example of a compendium object's schema for an example "issue" association object formatted in JSON in accordance with aspects of the present disclosure. FIG. 27 shows another example of a compendium object's schema for an example "source" association object formatted in JSON in accordance with aspects of the present disclosure. FIG. 28 shows another example of a compendium object's schema for an example "shorthand" association object formatted in JSON in accordance with aspects of the present disclosure. FIG. 29 shows another example of a compendium object's schema for an example "mnemonic" association object formatted in JSON in accordance with aspects of the present disclosure.

The controller is further preferably configured to receive user input from the user based on the first user-editable placeholder, e.g., the first user-editable placeholder 5.01 as shown in FIG. 5. The controller is further preferably configured to instantiate at least a second association object within the memory based on the received user input. For example, consider a scenario where the association object corresponding to the "Battery" has not yet been defined by the user, and as a consequence, a user-editable placeholder is shown in its place. User input received via the user-editable placeholder may then be received from the user, e.g., the string "Battery," and the controller may then instantiate one or a plurality of association objects as a result.

For instance, as shown in FIG. 5, this can include instantiating an association object in the memory that links to other association objects that correspond to the "Test operation," "Illustrations," "Policies," "Dicta" and "Case law" elements shown. The controller then stores the one or plurality of instantiated association objects within the compendium, with one such example association being shown at line 22 of FIG. 21A to line 128 of FIG. 21C. In one preferred example, a plurality of such association objects get generated based on, for example, the schema type value for the compendium such as shown at line 6 of FIG. 21A. Stated differently, each of the plurality of association objects preferably get instantiated by the controller with a predefined cue value based on the schema type value of the compendium (see e.g., line 6 of FIG. 21A) or the schema type of the at least one identified association object (see e.g., line 17 of FIG. 21A). In some cases, the plurality of instantiated association objects include a schema type value (see e.g., line 24 of FIG. 21A) that is different than the schema type value of that least one identified association object (see e.g., line 31 of FIG. 21A).

The controller is also further preferably configured to cause a representation of the second association object to be visualized on the display to the user and a second user-editable placeholder to be visualized on the display adjacent the representation of the second association object based on the schema type value of the at least one identified association object. In the previous example, this can include the plurality of user-editable placeholders shown in FIG. 5 following the user's addition of the "§ 1.1. Battery" element discussed above.

Preferably, each user-editable placeholder visualized on the display for the plurality of instantiated objects includes a constraint indicator. The constraint indicator preferably visually indicates to the user an expected type of data to be input by the user. For example, as shown in FIG. 5, the user-editable placeholder includes the string "An element or factor for this issue's governing test".

Preferably, each user-editable placeholder visualized on the display for the plurality of instantiated objects includes a study indicator. The study indicator can allow a user to designate the data input by the user via a given user-editable placeholder as enabled or disabled for study purposes, e.g., to be used by a test workflow/process consistent with the present disclosure. One such example is shown in FIG. 6.

Preferably, the memory further comprises at least one of an identifier of a professor, a semester identifier, a target exam date, an exam type value, and/or credit hour indicator associated with the at least one compendium.

Preferably, the memory further comprises an editor lookup table, the editor lookup table to store one or more user identifiers (IDs) with the ability to edit data of the at least one compendium.

Preferably, the memory further comprises a viewer lookup table, the viewer lookup table to store one or more user IDs with the ability to view data of the at least one compendium.

Preferably, the plurality of association objects are stored within the memory in a hierarchal configuration, the hierarchal configuration including at least one association object of the plurality of association objects having a responses collection that includes an ordered list of response objects. One such example is shown in FIGS. 21A-21C.

Preferably, the controller is further configured to cause the plurality of association objects to be visualized based on the hierarchal configuration such that each association object within the ordered list of the responses collection is visualized based on its corresponding index within the ordered list of the responses collection.

Preferably, the plurality of association objects are stored in a JSON format within the memory.

Preferably, the controller is further configured to generate a first test sequence based on the plurality of association objects stored in the memory.

Preferably, the controller is further configured to generate the test sequence based on identifying at least one association object of the plurality of association objects with a defined response. The controller further preferably identifies the at least one association object of the plurality of association objects with the defined response based on the responses collection of the identified at least one association object including at least one response object stored therein. Alternatively, or in addition, the controller identifies the at least one association object of the plurality of association objects with the defined response based on the responses collection of the identified at least one association object including at least one response object stored therein, and wherein the at least one response object includes a studiable value set to enabled/true.

The at least one association object of the plurality of association objects stored within the memory further preferably includes an association object stored within the corresponding responses collection. The association object further preferably includes a studiable flag/value and at least one cue value to be used during the generated test sequence to validate user input as correct.

The controller is further preferably configured to cause the generated test sequence to be visualized on the display to the user. The controller is further preferably configured to store one or more entries in a test result table in the memory based on user input from the user during visualization of the generated test sequence. The one or more entries stored within the test result table preferably represent answers input by a user based on the generated test sequence. Such represented answers can indicate correct and/or incorrect answer selections by the user during a test sequence/process consistent with the present disclosure. In some cases, each correct and/or incorrect answer stored within the one or more entries of the test result table is associated with an identifier of an association object of the plurality of association objects within a responses collection of an association object of the plurality of association objects. The entries within the result table preferably comport with the Study Data object definition shown in FIG. 20, for example.

The controller is further preferably configured to cause a representation of the plurality of association objects to be visualized on the display to the user based on the one or more entries within the test result table such that the association objects with a lowest number of correct answers represented within the test result table are displayed first and the association objects with a greatest number of correct answers represented within the result table are displayed last.

The controller is further preferably configured to cause a representation of the plurality of association objects to be visualized on the display to the user in an ordered list based on the one or more entries within the aforementioned test result table.

One additional example includes a method configured to implement any one or all of the various aspects and features of the example system discussed above.

Figure 32:
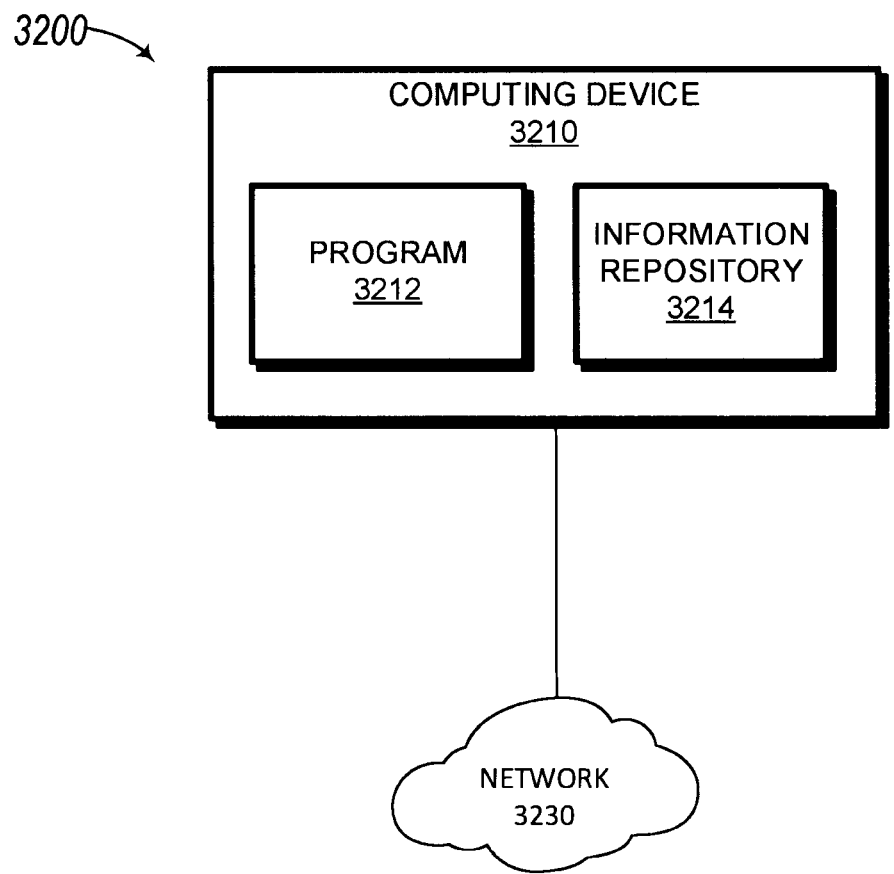
FIG. 32 is a functional block diagram illustrating a distributed data processing environment, in accordance with an embodiment of the present disclosure.

FIG. 32 is a functional block diagram illustrating a distributed data processing environment, generally designated 3200, suitable for operation of the program 3212 in accordance with at least one embodiment of the present disclosure. The term "distributed" as used herein describes a computer system that includes multiple, physically distinct devices that operate together as a single computer system. FIG. 32 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 3200 includes computing device 3210 optionally connected to network 3230. Network 3230 can be, for example, a telecommunications network, a local area network (LAN), a wide area network (WAN), such as the Internet, or a combination of the three, and can include wired, wireless, or fiber optic connections. Network 3230 can include one or more wired and/or wireless networks that are capable of receiving and transmitting data, voice, and/or video signals, including multimedia signals that include voice, data, and video information. In general, network 3230 can be any combination of connections and protocols that will support communications between computing device 3210 and other computing devices (not shown) within distributed data processing environment 3200.

Computing device 3210 can be a standalone computing device, a mobile computing device, or any other electronic device or computing system capable of receiving, sending, and processing data. In another embodiment, computing device 3210 can represent a server computing system utilizing multiple computers as a server system, such as in a cloud computing environment. In other embodiments, computing device 3210 may be a plurality of separate computing devices that are communicatively coupled, e.g., through network 3230.

In an embodiment, computing device 3210 includes the program 3212. In an embodiment, the program 3212 is a program, application, or subprogram of a larger program for managing compendiums of information within computer memory using a schema-driven data structure that reduces overall memory footprint using mutable, light-weight association objects. In an alternative embodiment, the program 3212 may be located on any other device accessible by computing device 3210 via network 3230.

In an embodiment, computing device 3210 includes information repository 3214. In an embodiment, information repository 3214 may be managed by the program 3212. In an alternate embodiment, information repository 3214 may be managed by the operating system of the computing device 3210, alone, or together with, the program 3212. Information repository 3214 is a data repository that can store, gather, compare, and/or combine information. In some embodiments, information repository 3214 is located externally to computing device 3210 and accessed through a communication network, such as network 3230. In some embodiments, information repository 3214 is stored on computing device 3210. In some embodiments, information repository 3214 may reside on another computing device (not shown), provided that information repository 3214 is accessible by computing device 3210. Information repository 3214 includes, but is not limited to, user data, course data, schema data, application data, compendium data, JSON data, object data, and other data that is received by the program 3212 from one or more sources, and data that is created by the program 3212.

Information repository 3214 may be implemented using any non-transitory volatile or non-volatile storage media for storing information, as known in the art. For example, information repository 3214 may be implemented with random-access memory (RAM), semiconductor memory, solid-state drives (SSD), one or more independent hard disk drives, multiple hard disk drives in a redundant array of independent disks (RAID), or an optical disc. Similarly, information repository 3214 may be implemented with any suitable storage architecture known in the art, such as a relational database, an object-oriented database, or one or more tables.

Figure 33:
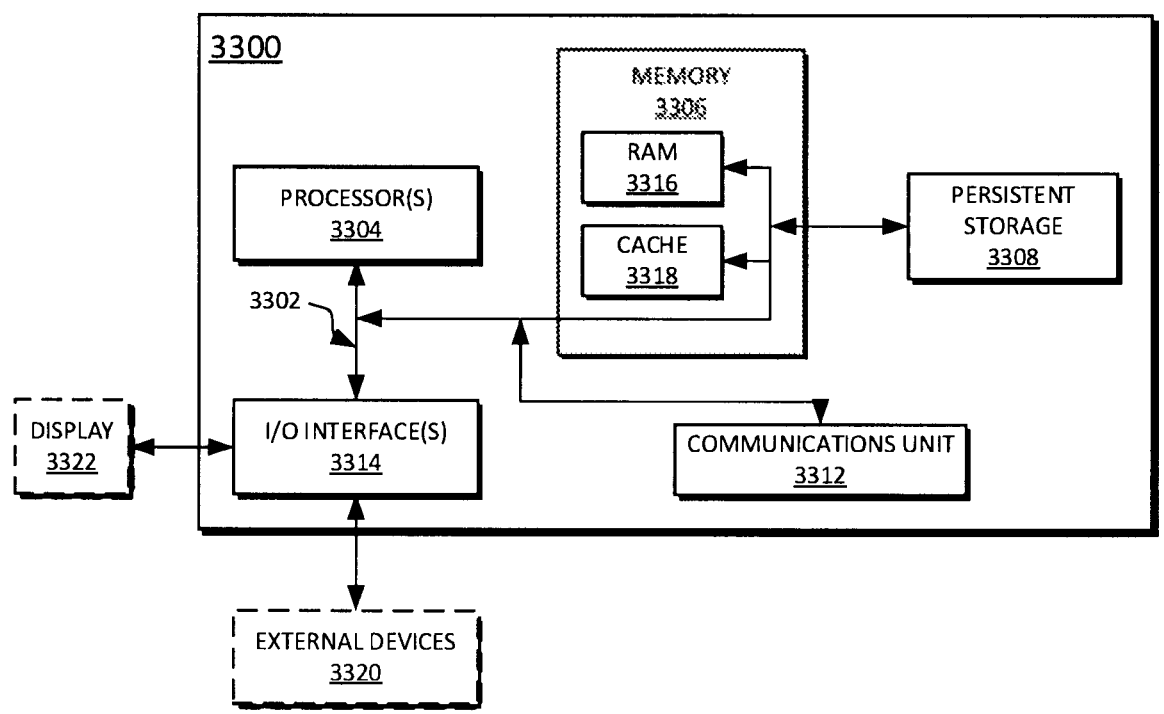
FIG. 33 depicts a block diagram of components of the computing device executing the program within the distributed data processing environment of FIG. 32, in accordance with an embodiment of the present disclosure.

FIG. 33 is a block diagram depicting components of one example computer 3300 of the computing device 3210 suitable for the program 3212, in accordance with at least one embodiment of the disclosure. FIG. 33 displays the computing device or computer 3300, one or more processor(s) 3304 (including one or more computer processors), a communications fabric 3302, a memory 3306 including, a random-access memory (RAM) 3316 and a cache 3318, a persistent storage 3308, a communications unit 3312, I/O interfaces 3314, a display 3322, and external devices 3320. It should be appreciated that FIG. 33 provides only an illustration of one embodiment and does not imply any limitations with regard to the environments in which different embodiments may be implemented. Many modifications to the depicted environment may be made.

As depicted, the computer 3300 operates over the communications fabric 3302, which provides communications between the processor(s) 3304, memory 3306, persistent storage 3308, communications unit 3312, and input/output (I/O) interface(s) 3314. The communications fabric 3302 may be implemented with an architecture suitable for passing data or control information between the processors 3304 (e.g., microprocessors, communications processors, and network processors), the memory 3306, the external devices 3320, and any other hardware components within a system. For example, the communications fabric 3302 may be implemented with one or more buses.

The memory 3306 and non-transitory persistent storage 3308 are non-transitory computer readable storage media. In the depicted embodiment, the memory 3306 comprises a RAM 3316 and a cache 3318. In general, the memory 3306 can include any suitable volatile or non-volatile non-transitory computer readable storage media. Cache 3318 is a fast memory that enhances the performance of processor(s) 3304 by holding recently accessed data, and near recently accessed data, from RAM 3316.

Program instructions for the program 3212 may be stored in the persistent storage 3308, or more generally, any non-transitory computer readable storage media, for execution by one or more of the respective processors 3304 via one or more memories of the memory 3306. The persistent storage 3308 may be a magnetic hard disk drive, a solid-state disk drive, a semiconductor storage device, flash memory, read only memory (ROM), electronically erasable programmable read-only memory (EEPROM), or any other non-transitory computer readable storage media that is capable of storing program instruction or digital information.

The media used by persistent storage 3308 may also be removable. For example, a removable hard drive may be used for persistent storage 3308. Other examples include optical and magnetic disks, thumb drives, and smart cards that are inserted into a drive for transfer onto another computer readable storage medium that is also part of persistent storage 3308.

The communications unit 3312, in these examples, provides for communications with other data processing systems or devices. In these examples, the communications unit 3312 includes one or more network interface cards. The communications unit 3312 may provide communications through the use of either or both physical and wireless communications links. In the context of some embodiments of the present disclosure, the source of the various input data may be physically remote to the computer 3300 such that the input data may be received, and the output similarly transmitted via the communications unit 3312.

The I/O interface(s) 3314 allows for input and output of data with other devices that may be connected to computer 3300. For example, the I/O interface(s) 3314 may provide a connection to external device(s) 3320 such as a keyboard, a keypad, a touch screen, a microphone, a digital camera, and/or some other suitable input device. External device(s) 3320 can also include portable non-transitory computer readable storage media such as, for example, thumb drives, portable optical or magnetic disks, and memory cards. Software and data used to practice embodiments of the present disclosure, e.g., the program 3212, can be stored on such portable non-transitory computer readable storage media and can be loaded onto persistent storage 3308 via the I/O interface(s) 3314. I/O interface(s) 3314 also connect to a display 3322.

Display 3322 provides a mechanism to display data to a user and may be, for example, a computer monitor. Display 3322 can also function as a touchscreen, such as a display of a tablet computer.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include a computer readable storage medium (or media) having computer readable program instructions thereon for causing a processor to carry out aspects of the present disclosure.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or other programmable logic devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for managing at least one compendium, the at least one compendium comprising a plurality of association objects that collectively provide an information-domain schema for associating cue values with corresponding user-provided responses, the system comprising:
   a memory having the plurality of association objects stored therein, each association object having at least a schema type value, a cue value, and a responses collection to store one or more association objects corresponding to the cue value;
   a controller configured to:
      identify at least one first association object of the plurality of association objects with an undefined response based on the responses collection of the first association object;
      cause a first user-editable placeholder to be visualized on a display to a user based on identifying the first association object with the undefined response;
      receive user input based on the first user-editable placeholder;
      instantiate at least a second association object within the memory based on the user input; and
      cause a representation of the second association object to be visualized on the display to the user and a second user-editable placeholder to be visualized on the display adjacent the representation of the second association object based on the schema type value of the at least one first association object.

2. The system of claim 1, wherein the controller is further configured to instantiate the plurality of association objects within the memory including the second association object based on the user input.

3. The system of claim 2, wherein each of the plurality of instantiated association objects include a predefined cue value based on the schema type value of the at least one first association object.

4. The system of claim 2, wherein each of the plurality of instantiated association objects include the schema type value that is different than the schema type value of the at least one first association object.

5. The system of claim 2, wherein the controller is further configured to cause the first user-editable placeholder and the second user-editable placeholder for each of the plurality of instantiated association objects to be visualized on the display to the user.

6. The system of claim 5, wherein the first user-editable placeholder and the second user-editable placeholder for each of the plurality of instantiated association objects visualized on the display includes a constraint indicator, the constraint indicator visually indicating to the user an expected type of data to be input by the user.

7. The system of claim 5, wherein each user-editable placeholder visualized on the display for the plurality of instantiated association objects includes a study indicator, the study indicator allowing a user to designate a data input by the user via a given user-editable placeholder as enabled or disabled for study.

8. The system of claim 1, wherein the plurality of association objects are stored within the memory in a hierarchal configuration, the hierarchal configuration including at least one association object of the plurality of association objects having the responses collection that includes an ordered list of response objects.

9. The system of claim 8, wherein the controller is configured to cause the plurality of association objects to be visualized based on the hierarchal configuration such that each response object of the ordered list of response objects is visualized based on a corresponding index within the ordered list of response objects.

10. The system of claim 8, wherein the controller is configured to generate a first test sequence based on the plurality of association objects stored in the memory.

11. The system of claim 10, wherein the controller is further configured to generate the first test sequence based on identifying at least one association object of the plurality of association objects with a defined response.

12. The system of claim 11, wherein at least one association object the plurality of association objects stored within the memory includes the response object stored within the responses collection, and wherein the response object includes a studiable flag and at least one value to be used during the generated first test sequence to validate user input as correct.

13. The system of claim 10, wherein the controller is further configured to cause the generated first test sequence to be visualized on the display to the user, and wherein the controller is configured to store one or more entries in a test result table in the memory based on user input from the user during visualization of the generated first test sequence, and wherein the one or more entries stored within the test result table represent answers input by a user based on the generated first test sequence.

14. The system of claim 13, wherein the answers indicate a correct answer and/or an incorrect answer selection by the user.

15. The system of claim 13, wherein each correct and/or incorrect answer stored within the one or more entries of the test result table is associated with an identifier of the association object of the plurality of association objects and/or the response object within the responses collection of an association object of the plurality of association objects.

16. The system of claim 15, wherein the controller is configured to cause the representation of the plurality of association objects to be visualized on the display to the user based on the one or more entries within the test result table such that plurality of association objects of the plurality of association objects with a lowest number of correct answers represented within the test result table are displayed first and the association objects with a greatest number of correct answers represented within the test result table are displayed last.

17. A computer-implemented method for managing at least one compendium, the computer-implemented method comprising:
    identifying, by one or more computer processors, at least one first association object of a plurality of association objects with an undefined response based on a responses collection of the first association object;
    causing, by the one or more computer processors, a first user-editable placeholder to be visualized on a display to a user based on identifying the at least one first association object with the undefined response;
    receiving, by the one or more computer processors, user input based on the first user-editable placeholder;
    instantiating, by the one or more computer processors, at least a second association object within a memory based on the user input; and
    causing, by the one or more computer processors, a representation of the second association object to be visualized on the display to the user and a second user-editable placeholder to be visualized on the display adjacent the representation of the second association object based on a schema type value of the at least one first association object.

18. The computer-implemented method of claim 17, further comprising:
    generating, by the one or more computer processors, a first test sequence based on the plurality of association objects stored in the memory;
    causing, by the one or more computer processors, the generated first test sequence to be visualized on the display to the user; and
    storing, by the one or more computer processors, one or more entries in a test result table in the memory based on an input from the user during visualization of the generated first test sequence, wherein the one or more entries stored within the test result table represent answers input by the user based on the generated first test sequence.

19. The computer-implemented method of claim 18, wherein storing the one or more entries in the test result table in the memory based on the input from the user during visualization of the generated first test sequence, wherein the one or more entries stored within the test result table represent answers input by the user based on the generated first test sequence further comprises:
    associating, by the one or more computer processors, the answers input by the user with an identifier of the association object of the plurality of association objects and/or a response object within the responses collection of an association object of the plurality of association objects; wherein the answers indicate a correct answer and/or an incorrect answer selection by the user.

20. The computer-implemented method of claim 19, further comprising:
    causing, by the one or more computer processors, the representation of the plurality of association objects to be visualized on the display to the user based on the one or more entries within the test result table such that plurality of association objects of the plurality of association objects with a lowest number of correct answers represented within the test result table are displayed first and the association objects with a greatest number of correct answers represented within the test result table are displayed last.

* * * * *